United States Patent
Platner et al.

(10) Patent No.: US 8,731,689 B2
(45) Date of Patent: May 20, 2014

(54) NETWORKED, WIRELESS LIGHTING CONTROL SYSTEM WITH DISTRIBUTED INTELLIGENCE

(75) Inventors: Brian P. Platner, Lyme, CT (US); William J. Fassbender, Watertown, CT (US); Ryan A. Zaveruha, Milford, CT (US); Frank J. Ramirez, Wallingford, CT (US); Philip S. Gross, Meriden, CT (US); Raymond A. Frigon, Watertown, CT (US)

(73) Assignee: ABL IP Holding, LLC, Conyers, GA (US)

( * ) Notice: Subject to any disclaimer, the term of this patent is extended or adjusted under 35 U.S.C. 154(b) by 1080 days.

(21) Appl. No.: 12/116,185

(22) Filed: May 6, 2008

(65) Prior Publication Data

US 2009/0278479 A1    Nov. 12, 2009

(51) Int. Cl.
G05B 11/01    (2006.01)
H05B 37/00    (2006.01)

(52) U.S. Cl.
USPC .............................................. 700/22; 315/312

(58) Field of Classification Search
None
See application file for complete search history.

(56) References Cited

U.S. PATENT DOCUMENTS

| | | |
|---|---|---|
| 5,473,202 A | 12/1995 | Mudge et al. |
| 5,640,143 A | 6/1997 | Myron et al. |
| 5,699,243 A | 12/1997 | Eckel et al. |
| 5,701,117 A | 12/1997 | Platner et al. |
| 5,986,357 A | 11/1999 | Myron et al. |
| 6,078,253 A | 6/2000 | Fowler |
| 6,122,678 A | 9/2000 | Eckel et al. |
| RE37,135 E * | 4/2001 | Elwell .......................... 315/154 |
| 6,215,398 B1 | 4/2001 | Platner et al. |
| 6,304,180 B1 | 10/2001 | Platner et al. |
| 6,388,399 B1 * | 5/2002 | Eckel et al. ................... 315/312 |

(Continued)

FOREIGN PATENT DOCUMENTS

GB    2 449 987    12/2008

OTHER PUBLICATIONS

Philips Corporation, "LightMaster Modular Lighting Control Modules: LMM LNS 3.2 Plug-ins Reference Manual, version 0.4, Philips Lighting Controls 2005 from http://www.lighting.philips.com/pwc_li/no_no/application_areas/Assets/pdf/lightmaster_modular/LMM%20LNS%203.pdf", pp. 1-63.*

(Continued)

*Primary Examiner* — Kakali Chaki
*Assistant Examiner* — Walter Hanchak
(74) *Attorney, Agent, or Firm* — Dugan & Dugan, PC; Garry J. Tuma

(57) ABSTRACT

A programmable lighting control system integrates time-based, sensor-based, and manual control of lighting and other loads. The system includes one or more groups of controlled lighting areas, which may be, for example, floors of a building. Each group may have one or more lighting zones, which may be, for example, individual rooms or offices on a building floor. Each lighting zone includes occupancy and/or daylight sensors that may be wirelessly coupled to a gateway of the group. Each gateway is coupled to a network, such as, for example, a local area network (LAN). Control software, residing on a computer (e.g., a personal computer or a server) coupled to the network and accessible via the network, remotely communicates with and controls the lighting zones either individually, groupwise, or globally. Each lighting zone can also be locally controlled at the gateway and can function independently of the control software and the gateway.

35 Claims, 35 Drawing Sheets

(56) References Cited

U.S. PATENT DOCUMENTS

| | | |
|---|---|---|
| 6,697,757 B2 | 2/2004 | Eckel et al. |
| 6,798,341 B1 | 9/2004 | Eckel et al. |
| 6,993,417 B2 * | 1/2006 | Osann, Jr. ............... 700/291 |
| 7,103,511 B2 | 9/2006 | Petite |
| 7,411,489 B1 * | 8/2008 | Elwell et al. ............... 340/501 |
| 7,471,051 B1 * | 12/2008 | Wacknov et al. ............ 315/291 |
| 7,486,193 B2 * | 2/2009 | Elwell ..................... 340/573.1 |
| 7,668,990 B2 * | 2/2010 | Krzyzanowski et al. ...... 710/72 |
| 7,865,252 B2 * | 1/2011 | Clayton ..................... 700/19 |
| 2002/0186209 A1 | 12/2002 | Cok |
| 2003/0090210 A1 | 5/2003 | Bierman |
| 2005/0128751 A1 | 6/2005 | Roberge et al. |
| 2005/0252984 A1 | 11/2005 | Ahmed |
| 2006/0267566 A1 | 11/2006 | Williams et al. |
| 2007/0091623 A1 | 4/2007 | Walters et al. |
| 2007/0145915 A1 * | 6/2007 | Roberge et al. .............. 315/312 |
| 2008/0079568 A1 | 4/2008 | Primous et al. |
| 2008/0197790 A1 * | 8/2008 | Mangiaracina et al. ...... 315/312 |
| 2008/0294918 A1 * | 11/2008 | Dhuyvetter et al. .......... 713/310 |
| 2008/0303747 A1 * | 12/2008 | Velicescu ..................... 345/1.3 |
| 2009/0026979 A1 * | 1/2009 | Reid ............................. 315/297 |

OTHER PUBLICATIONS

Sensorswitch Design Guide and Catalog: nLight Control System, published by Sensorswitch, Wallingford, CT, "http://www.sensorswitch.com/literature/nlight_catalog.pdf", Nov. 2007, pp. 1-64.*

"Digital Addressable Lighting Interface," Wikipedia, the free encyclopedia, http://en.wikipedia.org/wiki/Digital_Addressable_Lighting_Interface, Wikimedia Foundation, Inc., 3 pages, last modified Mar. 27, 2008, downloaded Apr. 18, 2008.

* cited by examiner

NETWORKED, WIRELESS LIGHTING CONTROL SYSTEM WITH DISTRIBUTED INTELLIGENCE

FIELD OF THE INVENTION

The invention relates to lighting control systems. More particularly, the invention relates to networked lighting control systems that use wired or wireless connectivity and distributed intelligence to control multiple zones of room or area lighting.

BACKGROUND OF THE INVENTION

Lighting control systems automate the operation of lighting devices throughout a building or residence based upon preset time schedules and/or occupancy and/or daylight sensing. These systems may also be used to automate the operation of other electrical devices or appliances ranging from, for example, simple fans to more complex HVAC (heating, ventilating, and air conditioning) systems. These systems may further be used in conjunction with fire and/or security systems. Lighting control systems typically employ occupancy sensors and/or daylight sensors to determine which lighting devices to activate, deactivate, or adjust the light level of, and when to do so. Occupancy sensors typically sense the presence of one or more persons within a defined area and generate signals indicative of that presence. Daylight sensors typically sense the amount of daylight present within a defined area and generate signals indicative of that amount. Known lighting control systems receive those sensor signals at a central lighting control panel, which may be located, for example, in a building manager's relays, switching devices, and/or dimming ballasts to drive in order to turn on or off and/or adjust the light levels of one or more lighting devices.

Lighting control systems are advantageous because they reduce energy costs by automatically lowering light levels or turning off devices and appliances when not needed, and they allow all devices in the system to be controlled from one location.

Known lighting control systems also have, however, many disadvantages. For example, one type of known system requires each sensor, manually-operated switch, and load (i.e., a lighting or other electrical device to be controlled by the system) to be hardwired to the lighting control panel or to a main communications bus, which is hardwired to the lighting control panel. Relays for connecting/disconnecting power to loads are usually incorporated in the control panel. Many commercial, educational, and industrial settings can have hundreds, if not thousands, of sensors, switches, and loads. Accordingly, hardwiring each device to a main bus or control panel often involves long wire runs that result in costly and time consuming installation and maintenance.

Another disadvantage of known lighting control systems is that all decision making occurs at the control panel. Thus, if the control panel becomes inoperative, all lighting devices in the system are no longer under automated control and some or all may not operate even manually. Similarly, if a connection to or from the control panel is severed, the lighting devices served by that connection are no longer under automated control and also may not operate manually.

Still another disadvantage is the one-way communication from the sensors to the control panel. Changes to a sensor's operational settings, parameters, or modes (e.g., sensor time delays, photocell set-points, etc.) have to be made at the individual sensor itself and cannot be made from the control panel.

Conversely, a further disadvantage is that any partial or system-wide functional change, such as an immediate need to override current system settings (e.g., during a fire or other emergency), cannot be made from anywhere but the control panel. Likewise, even routine modifications, such as to a preset time schedule of some or all of the lighting devices, cannot be made from anywhere but the control panel even if that location is not convenient at the time.

Another type of known lighting control system is referred to as a "DALI" (digital addressable lighting interface) system, which adheres to a standardized digital protocol. This system includes dimming and electrical ballasts as well as sensors (e.g., daylight and occupancy), manually-operated switches, lighting and perhaps other loads, and a central controller running application software. A DALI controller can communicate with devices in the system via bi-directional data exchange. However, a disadvantage is that every device in the system with which the controller is to communicate has to be assigned an address that has to be manually identified to the controller upon start-up (known as "commissioning"). Initial set-up and subsequent modification of a DALI-based system can thus be complicated and time consuming. Moreover, if the assignment of addresses does not correspond in some way to the devices' physical location, maintenance and replacement of faulty devices can also be complicated and time consuming. Another disadvantage of a DALI-based system is the limited number of addresses available, which is believed to be 64. DALI therefore cannot be used in large installations without using another technology to overcome the limitation, which increases the complexity of the system. DALI-based systems also have the same disadvantages as other known centrally-controlled systems: they are vulnerable to controller malfunctions/outages, severed connections, and the inability to make local or global operational mode changes from anywhere but the central controller.

In view of the foregoing, it would be desirable to be able to provide a networked, wireless lighting control system with distributed intelligence for both global and local lighting control capabilities and for local independent operation.

SUMMARY OF THE INVENTION

In accordance with the invention, a lighting control system is provided that effectively integrates time-based, sensor-based, and manual control with distributed intelligence throughout a building or building complex. As used herein, distributed intelligence means that all lighting control decisions, as well as all switching and dimming actions, are carried out by the devices within each individual "lighting zone." A lighting zone may be, for example, an individual room or office, a classroom, a manufacturing area, a lobby, or other defined area. Lighting zones include one or more intelligent devices such as, for example, occupancy sensors, daylight sensors, power packs, and manually-operated switches. The intelligence is provided by microcontrollers and firmware incorporated in preferably each device. Relays connecting/disconnecting power to lighting devices are located locally within the lighting control zone, such as, for example, in sensors and/or power packs. The manually-operated switches are connected in series with the lights (i.e., the load) and are typically mounted in a single gang wall unit that may also include a sensor and/or a relay. The lighting control system of the invention is "self-commissioning," which means the system automatically searches for and identifies devices connected to it, thus eliminating the tedious and time consuming task of manually identifying each device in the system. The system can be wirelessly connected between lighting zones and centrally, but not exclusively, controlled via Web-based (i.e., World Wide Web-based) lighting control software executing on a host computer. Advantageously, the Web-based software provides global access to the lighting system, which means the system can be remotely controlled from anywhere in the world where Web access is available. Remote system upgrades and status inquiries can be easily performed via the control software. Moreover, each of the zones alternatively may be controlled locally, via a wall unit in the zone or a gateway device nearby. Gateway devices connect multiple lighting zones to a preferably Ethernet local area network ("LAN") to which the host computer executing the Web-based lighting control software is connected. The system advantageously eliminates the need for centrally hard-wired equipment and enables the devices of each zone to function independently of any central control. That is, the Web-based software does not make lighting control decisions—those decisions are made in the individual lighting control zones by the intelligent devices deployed therein. Thus, connection to the host computer is not required in order to maintain automated lighting control in each of the lighting control zones of the system. The lighting control system can be advantageously deployed in schools, offices, museums, government buildings, apartment and building complexes, parking garages, factories, retail stores and malls, and combinations thereof.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
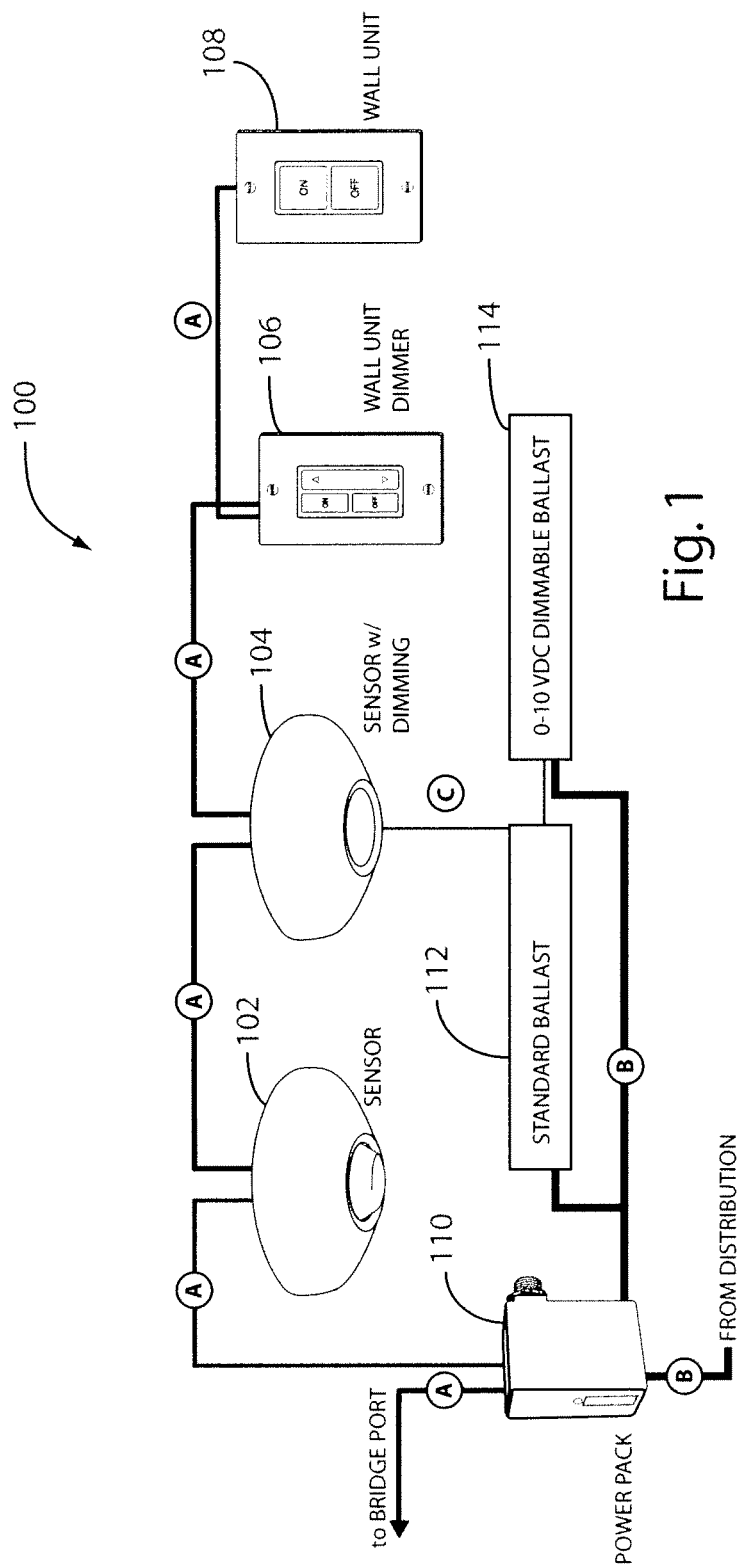
FIGS. 1-3 illustrate various exemplary embodiments of lighting control zones according to the invention.

The lighting control system of the invention incorporates time-based, sensor-based, and manual control. Time-based control automatically switches lights on and off based upon preset time schedules or astronomical clocks. Sensor-based control automatically switches lights on and off based upon occupancy and/or daylight. And manual control switches lights on and off based upon manual toggling of a wall switch by a user.

The lighting control system of the invention advantageously provides numerous programmable settings/operational modes that can be configured individually for each lighting control zone. Settings include numerical device parameters, such as time delays for occupancy sensing and photocell set-points for daylight sensing. Other settings include switch operation (e.g., manual/automatic on), dimming limits, enable/disable sound detection, broadcast channel for switches and sensors (e.g., occupancy and daylight), and source channel for switches and sensors (e.g., occupancy and daylight). "Broadcast channel" refers to any of several possible channels on which all switches and sensors of the invention can be configured to output their information. Some sensors can output two "poles" of occupancy or daylight information on two channels simultaneously, and each pole can be independently configured with different parameter settings, such as time delay. Devices with relays or dimming outputs can then be configured to "listen" to any combination of the available channels via their "source channel" settings, which advantageously can be changed remotely or at the device. Still other settings detail a zone's operational mode. Operational modes define how a zone's relays and/or dimming outputs react to events such as occupancy, daylight, and manual switching. Operational modes include: override lights on or off; scheduled lights on or off: automatic on or off with astronomical clock; manual on or off via local switch; track or ignore occupancy, daylight, and/or switch(es); and follow only internal occupancy, photocell, and/or internal switch(es). The "follow only" modes refer to those wall units of the invention that are a combination relay and either a sensor, a manual switch, or both a sensor and a manual switch. These units can be programmed to operate such that only the devices' internal source (sensor, photocell, or switch) affects that unit's relay or dimming output.

The factory default setting for all relays and dimming outputs in a lighting control zone is to track all occupancy and daylight sensors and manually-operated switches within that zone. This setting creates the following "normal" operational mode, referred to as "automatic on/automatic off/permanent off:" lights automatically turn on when occupancy is sensed, lights automatically turn off when vacancy or sufficient daylight is sensed, and lights turn off and stay off when the wall switch is manually pressed regardless of occupancy or daylight. The switch has to be pressed again to turn the lights back on and restore the sensor to automatic on/automatic off operation.

Lighting control zones that have both sensors and manually-operated switches can be further configured to operate in the following advanced modes of operation: manual on to semi-automatic, manual on to override on, manual on to fully automatic, and predictive off. The "semi-automatic" mode operates as follows: The lights are initially off and the sensors are ignored. A manually-operated switch is pressed to turn on the lights. Once on, the manually-operated switches in that zone will have permanent-off functionality as described above. When occupancy is no longer sensed, the sensor times out after a time delay and the lights automatically turn off. The time delay is programmable and allows a user to momentarily leave the room or defined area and return (within the time delay) without the lights turning off. Once the lights do turn off, there is an additional grace period during which re-entry into the room or area will automatically turn the lights back on, and the sensor(s) will continue to monitor occupancy and/or daylight. Once the sensor turns off the lights, and the additional grace period expires, the lights will not automatically turn back on if occupancy or insufficient daylight is sensed. The user will have to manually turn the lights back on with a switch press.

The "manual on to override on" mode disables the automatic off feature once the wall switch is manually pressed to initially turn on the lights. In this mode, the lights stay on regardless of vacancy or sufficient daylight.

The "manual on to fully automatic" mode operates as follows: The lights are initially off and the sensor is ignored. A manually-operated switch is pressed to turn on the lights. The switch press also activates the sensor to operate fully automatically (i.e., automatic on/automatic off), while the switch resumes permanent off functionality. So long as occupancy is sensed, the lights will stay on. When occupancy is no longer sensed, the sensor times out after the time delay and the lights automatically turn off. When occupancy is again sensed, the lights automatically turn back on.

Another advantageous feature of the invention is the "predictive off" mode. Rather than create the habit of walking out of a room without turning off the lights (because presumably a lighting control system will do it automatically), this mode does not automatically turn off the lights when an occupant leaves the room. Upon an occupant manually turning off the lights, the occupancy sensor determines whether the occupant has stayed in the room (e.g., to view a slide projection) or left the room. If the occupant has stayed in the room, the lights will stay off until the wall switch is pressed again. If the occupant has left the room, the lights will turn on automatically when the next occupant enters the room.

The lighting control system of the invention has three main components: devices, lighting control zones, and a network backbone. Each device, which may be an occupancy sensor, a daylight sensor, a power pack, or a wall unit, has the ability to communicate over the network backbone. Each device preferably has an integrated microcontroller and firmware and is equipped with preferably RJ-45 style communication ports.

A lighting control zone is a collection of devices that function together to control the lighting of a defined area. For example, a lighting control zone may be an office lobby that includes an occupancy sensor, power pack, and wall unit that controls the lighting in the lobby. Devices within a zone are wired in a daisy-chain fashion advantageously in any order preferably using standard category 5 ("CAT-5") cabling. While lighting control zones are typically made up of multiple devices of different types, a zone may contain just a single device. A zone may also have multiple instances of the same device or device type, such as, for example, two or more occupancy sensors or power packs of the same or different type. Multiple lighting control zones are networked together. Each lighting control zone, however, advantageously retains the ability to function independently from the rest of the system. That is, there is no dependence on a central controller to make lighting control decisions and issue lighting control commands for each lighting control zone. Moreover, a lighting control zone does not even require a physical connection to a central controller in order to operate automatically and independently.

The network backbone of the invention is the communication network that interconnects the lighting control zones and the Web-based lighting control software. The network backbone includes devices referred to as bridges and gateways that work together to transport and route information between lighting control zones and the lighting control software. Multiple control zones can be wired individually to a bridge. The bridge is a device that acts as a hub by aggregating communication traffic from these connected zones and placing that traffic onto the backbone. A bridge also acts as a communications router by forwarding information from the backbone to the applicable zones. Gateways are devices that link the backbone to a preferably Ethernet LAN where a host computer executing the control software resides. The network backbone of the invention advantageously can include multiple bridges and gateways deployed in virtually any physical topology. Bridges and gateways communicate via wired CAT-5 connections and/or wireless connections over a wireless mesh network.

A wireless mesh network advantageously provides multiple redundant paths of communication between a collection of devices. Every wireless device in a mesh network is an active transmitter, receiver, and router of information. Once initiated to start or join a network, mesh networking devices automatically establish communication with as many other devices as possible. Benefits of a wireless mesh network include elimination of cables that are costly to run and are at risk of being cut; inherent self-healing, thus preventing single device failures from interrupting communication; navigation around blocked paths; and reliable delivery of messages and control commands to their destinations even in adverse conditions. While certain embodiments of bridges have internal circuitry capable of wireless communication, gateways require connection to a wireless transceiver/power supply of the invention (described below) or wireless bridge in order to communicate wirelessly. While the range of two wireless (radio) devices with line of sight can be several hundred feet, wireless devices of the invention spaced within 100 feet of each other is recommended. To span longer distances, the transceiver/power supplies of the invention should be deployed midspan. If a network contains more than one gateway, multiple radio frequency (RF) channels are available to designate bridges to specific gateways. Simple push-button commands are used to start and join a device to a particular mesh network of the invention.

The wireless mesh network used in the lighting control system of the invention is preferably a ZigBee® mesh network. A ZigBee® mesh network is a wireless mesh networking standard characterized by low power consumption, support for multiple network structures, and secure connections. The standard is regulated by a group known as the ZigBee® Alliance.

The lighting control system of the invention may be controlled by a user four ways: through a local wall unit, through a nearby gateway device, at the host computer executing the Web-based control software, or remotely via access to the Web-based control software with a laptop or other computer, workstation, or handheld device. The simplest level of user control is via the wall unit. These single gang devices are located within a lighting control zone and provide the local user with the ability to control the lighting in that zone. Turning the zone's lights on/off, adjusting the dimming level, or selecting one of four preset lighting profiles are available features on the various types of wall units of the invention (described below).

Figure 2:
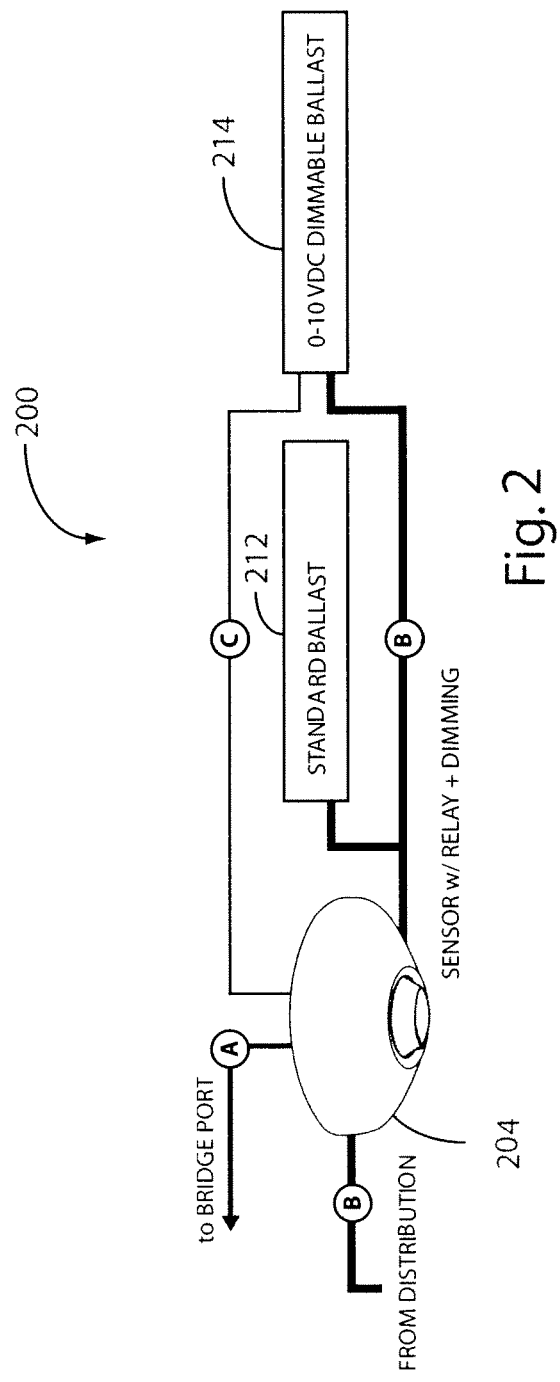
Figure 3:
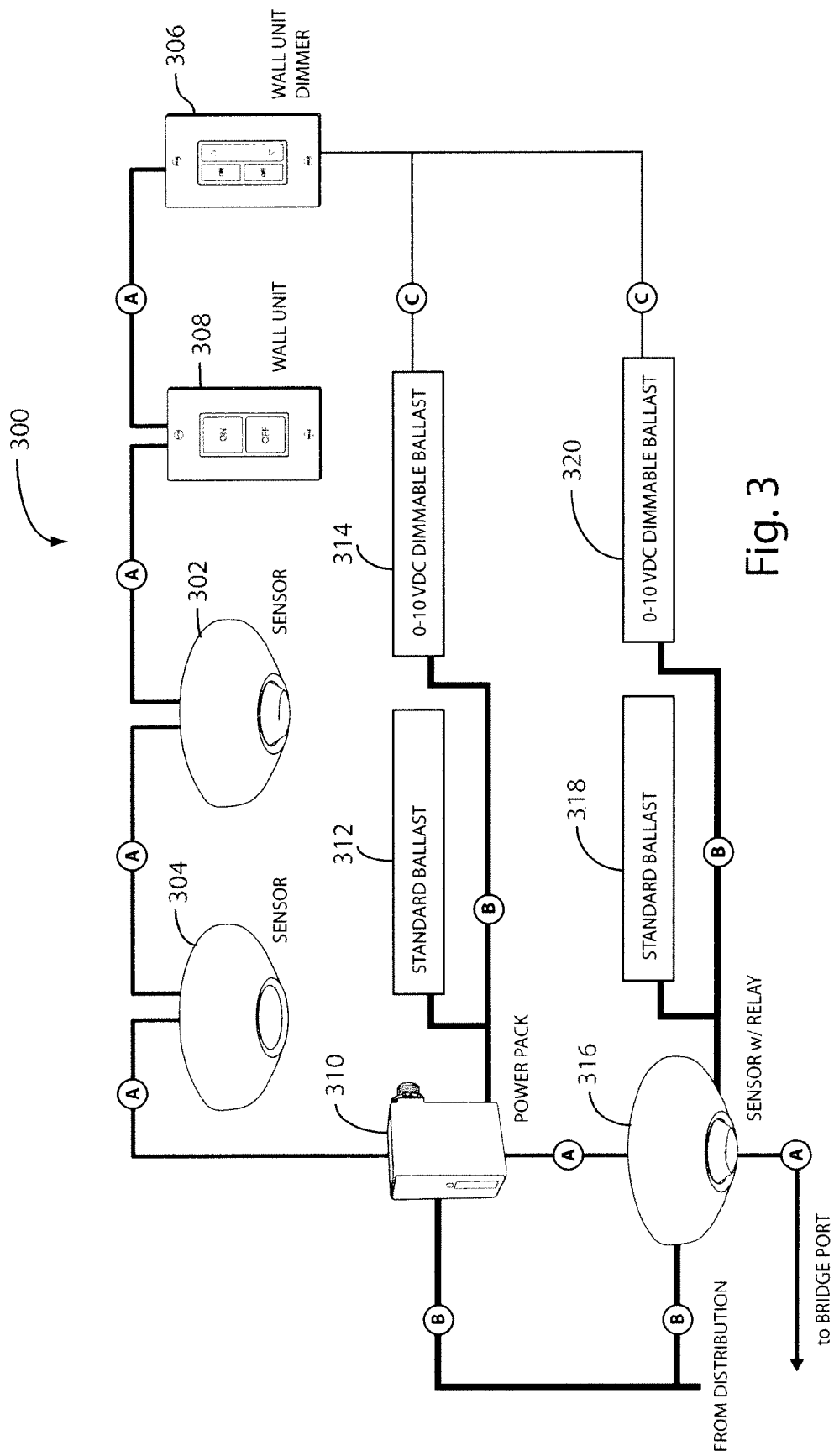

FIGS. 1-3 show various configurations of lighting control zones according to the invention. In FIG. 1, zone 100 includes occupancy sensor 102, daylight sensor 104, manually-operated dimmer switch wall unit 106, manually-operated toggle switch wall unit 108, power pack 110, load 112, and load 114. Load 112 may be a light or other device with on/off functionality driven by a standard ballast, while load 114 may be a dimmable lighting device driven by a 0-10 VDC dimmable ballast. Note that other types of loads may be controlled by the devices of zone 100. Daylight sensor 104 communicates with dimmable ballast 114 via low voltage Class 2 wiring C. Sensors 102 and 104 and wall units 106 and 108 receive power from and are connected to power pack 110 via CAT-5 cabling A. Power pack 110 is also connected to a bridge (not shown) via CAT-5 cabling A. Line voltage (e.g., 120/277/347 VAC) is connected to power pack 110 via Class 1 wiring B. Power pack 110 has an integrated relay controlled by the sensors and wall units to connect/disconnect line voltage to loads 112 and 114 also via Class 1 wiring B.

FIG. 2 illustrates a lighting control zone 200 that has only a single device, daylight sensor 204. Sensor 204 is connected to a bridge (not shown) via CAT-5 cabling A and to load 214, which has a dimmable ballast, via low voltage Class 2 wiring C. Line voltage is connected to sensor 204 via Class 1 wiring B. Sensor 204 includes an integrated relay, which is connected to loads 212 and 214 also via Class 1 wiring B. Daylight sensor 204 controls the on/off operation of load 212, which may be a lighting device driven by a standard ballast, and controls the on/off operation and dimming level of load 214, which may be a lighting device driven by a 0-10 VDC dimmable ballast.

FIG. 3 illustrates another embodiment of a lighting control zone. Zone 300 includes occupancy sensor 302, daylight sensor 304, manually-operated dimmer switch wall unit 306, manually-operated toggle switch wall unit 308, power pack 310, loads 312 and 314, occupancy sensor 316, and loads 318 and 320. Sensors 302 and 304 and wall units 306 and 308 receive power from and are connected to power pack 310 via CAT-5 cabling A. Power pack 310 also provides power and is connected to sensor 316 via CAT-5 cabling A. Occupancy sensor 316, which has an integrated relay, is in turn connected to a bridge (not shown) via CAT-5 cabling A. Line voltage is connected to power pack 310 via Class 1 wiring B from a first electrical circuit, while line voltage from a second electrical circuit is connected to sensor 316 also via Class 1 wiring B. The relay output of power pack 310 is connected to loads 312 and 314 via line voltage Class 1 wiring B, and the relay output of sensor 316 is connected to loads 318 and 320 also via line voltage Class 1 wiring B. Loads 314 and 320, which are dimmable lighting devices controlled by dimmable ballasts, receive dimming control signals via low voltage Class 2 wiring connected to dimmer switch wall unit 306. Within zone 300, dimming control signals may originate from either dimmer switch wall unit 306 or daylight sensor 304. The zone can be programmed such that any one or all of sensors 302, 304, and 316 and wall units 306 and 308 can control any one or all of loads 312, 314, 318, and 320.

Figure 4:
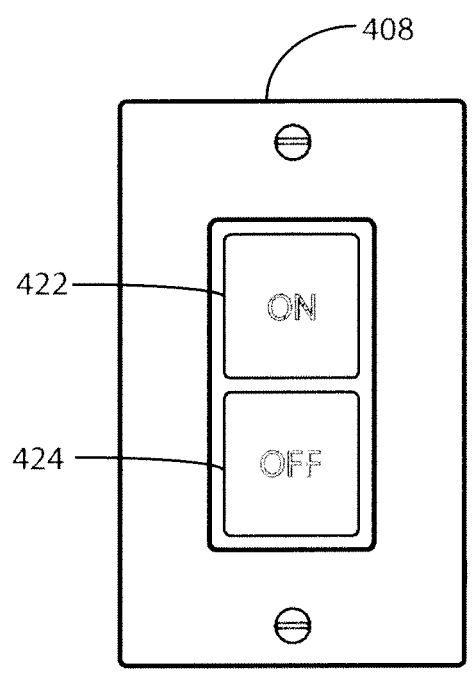
FIGS. 4 and 5 illustrate two exemplary embodiments of wall units according to the invention.
Figure 5:
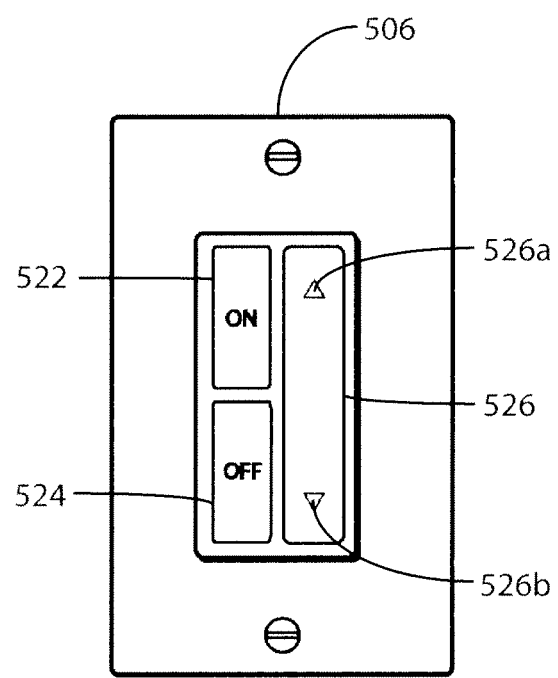

FIGS. 4 and 5 show two embodiments of wall units in accordance with the invention. Manually-operated toggle switch wall unit 408 and manually-operated dimmer switch wall unit 506 provide a user with local control of a lighting zone. Each wall unit can operate with either low voltage or line voltage. A low voltage unit works with a power pack of the invention to provide toggle switch operation and/or dimming adjustability of a 1-10 VDC dimmable lighting device. A line voltage unit provides the same switch operation and/or dimming adjustability as the low voltage unit, but also includes an integrated relay enabling it to switch line voltage to a load (e.g., a lighting device). Line voltage units also have reversible relay logic and interchangeable hot and load wires for easy installation. The default operation of a wall unit is to act as a standard toggle switch. Additionally, the wall units can participate in the following advanced control modes: semi-automatic, manual to override on, manual to fully automatic, and predictive off. Wall units of the invention have two preferably RJ-45 connector ports (not shown), communicate with other devices via CAT-5 cabling connected to their connectors ports, and are remotely configurable and upgradeable via the lighting control software.

These single gang wall units use finger-touch controls 422, 424, and 522, 524, and 526 instead of mechanical push-buttons or slides. Pressing touch controls 422 and 522 turns on a serially connected load, while pressing touch controls 424 and 524 turns off the serially connected load. Pressing touch control 526, which is a dimmer control, on or near up-arrow 526a increases the light level of the serially connected load, while pressing touch control 526 on or near down-arrow 526b decreases the light level of the serially connected load.

Figure 6:
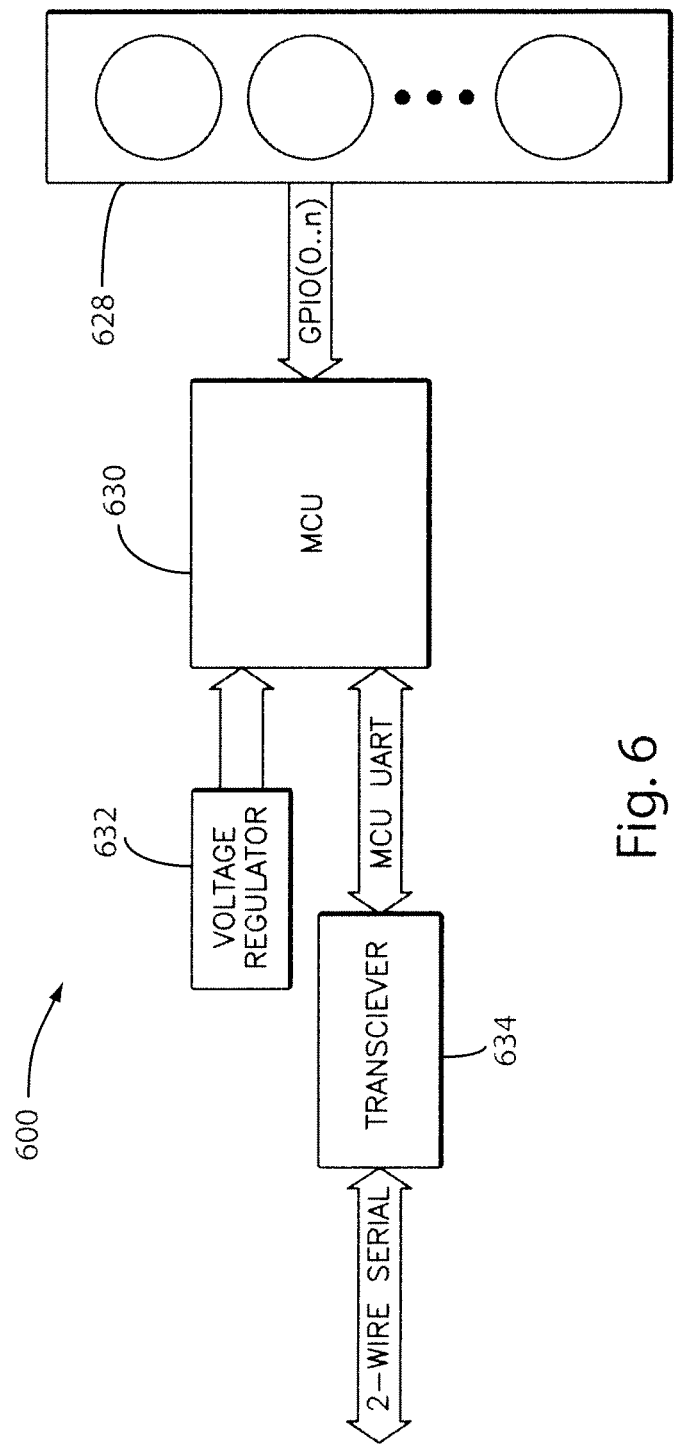
FIG. 6 is a block diagram of an exemplary embodiment of finger-touch controls according to the invention.

The finger-touch controls of the invention use a capacitive sense technology and, as shown in FIG. 6, are advantageously implemented with only a single microcontroller (known finger-touch controls are typically implemented with two processors each running special firmware, a first processor scanning and decoding the electrical pad capacitance when a finger is sensed and the second processor reading and communicating the state of the sensors). Finger-touch controls 600 includes touch control pads 628, which is an array of flexboard sensors, microcontroller 630, which may be a Texas Instruments MSP430F2272, a voltage regulator 632, and a preferably EIA-485 transceiver 634 connected via the 2-wire serial bus to the RJ-45 connector ports. Resistor-based capacitive measurements from touch control pads 628 are input to the microcontroller via the general purpose I/O pins (GPIO). That is, the charge or discharge through a resistor of a capacitive sensor in control pads 628 is measured and processed by microcontroller 630. This approach reduces the complexity of the software and internal hardware of the microcontroller and the hardware of the finger-touch controls.

Figure 7:
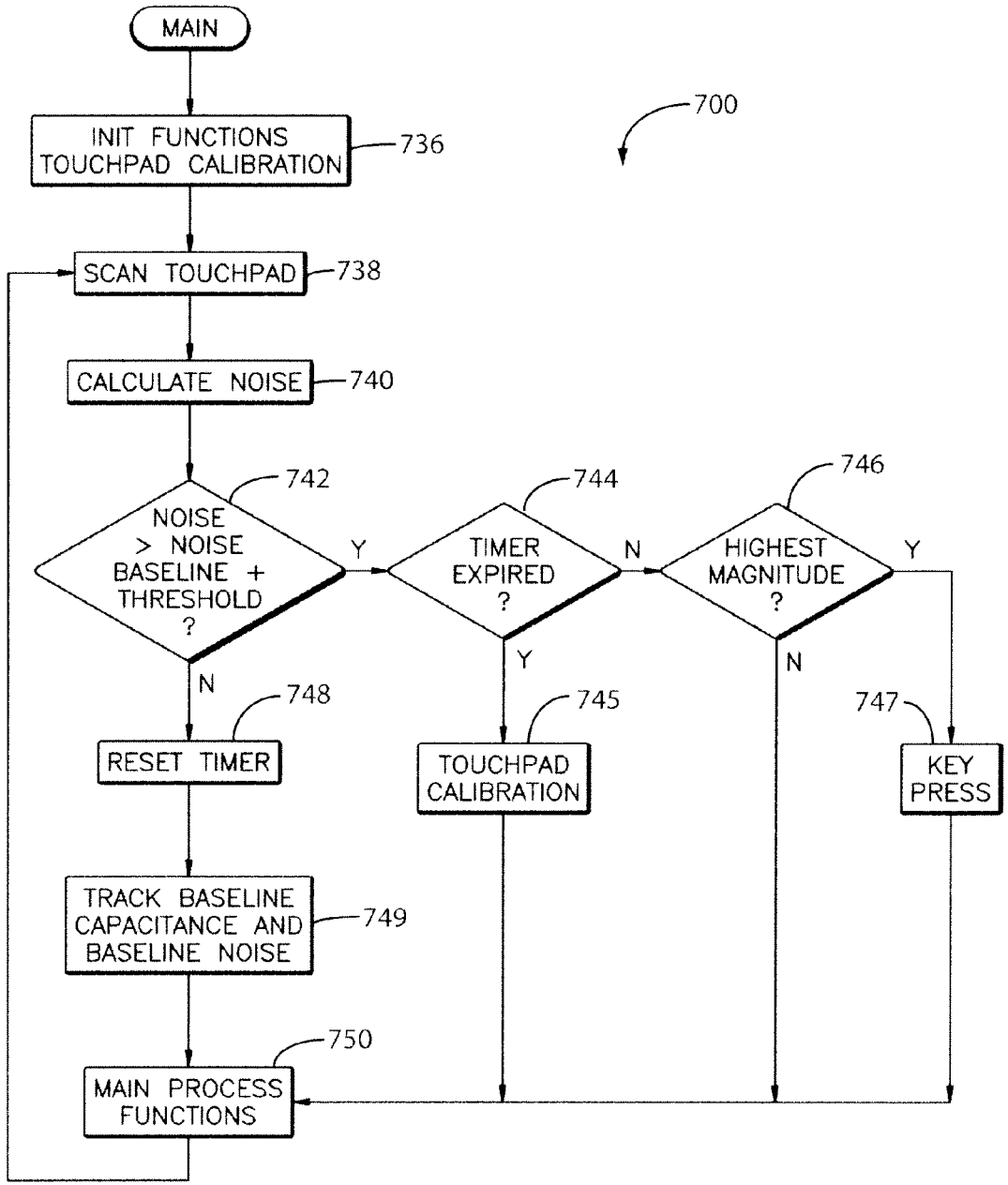
FIG. 7 is a flow chart of an exemplary embodiment of finger-touch control software according to the invention.

FIG. 7 is a flowchart representing the software code developed to ensure proper operation of the finger-touch controls throughout a range of different conditions. Because wall units of the invention interface with ballasts and, in some configurations, line voltage with internal relays, EMI (electromagnetic interference) and RF (radio frequency) interference may be radiated that affect the operation of the touch control circuit. Noise detection routine 700 detects and measures the amount of noise (e.g., EMI and RF interference) sensed from the flexboard circuit of the touch control pads 628. The measured noise is then used to dynamically adjust the thresholds for real signal detection. During the calibration process, the readings are registered as the initial baseline of the system. During normal operation, microcontroller 630 continually monitors the amount of noise and the baseline capacitance, adapting the system to different environmental conditions. This software advantageously eliminates the need for hardware filters in the design.

At block 736, finger-touch controls 600 are initialized by detecting noise and the baseline capacitance and accordingly calibrating touch control pads 628. At block 738, touch control pads 628 are scanned to measure their capacitance. At block 740, the noise is calculated based on the difference between the capacitance measurements and the capacitance baseline. At block 742, the current noise is compared to the noise baseline. If the current noise is below the threshold, a timer is reset at block 748. At block 749, the current measurements are used to update the baseline capacitance and baseline noise. If the current noise is above the threshold, the state of the timer is checked at block 744. If the timer has expired, touch control pads 628 are recalibrated at block 745. If the timer has not expired, the magnitude of the noise of the current pad is compared to that of the other pads at block 746. If the noise magnitude of the current pad is the highest of all the pads, then that control pad 628 has been touched, and the associated action is processed at block 747 by microcontroller 630. At block 750, the remaining functionality of the device is handled, such as, for example, serial communication, settings, status, relay control, etc.

Figure 8:
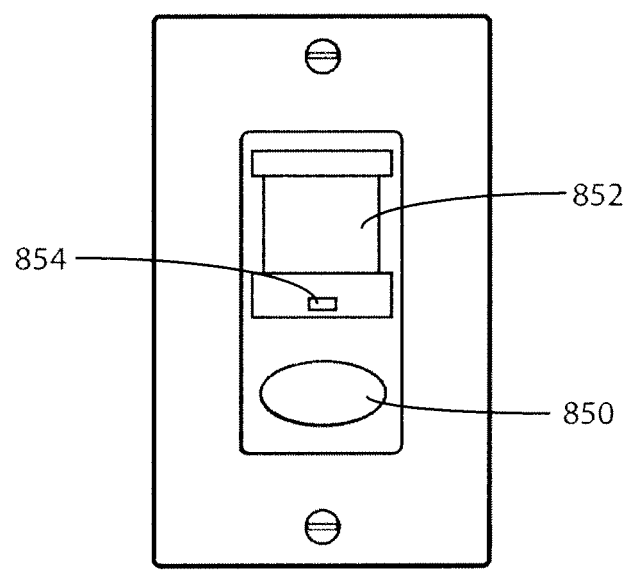
FIG. 8 illustrates an exemplary embodiment of a wall unit configured with a wall switch and sensor according to the invention.

Wall units of the invention can also be configured with a wall switch sensor as shown in FIG. 8. This conveniently adds occupancy detection to a room with an existing toggle switch. In one embodiment, the occupancy sensor can detect small motion up to about 20 feet away. These wall units can communicate over the lighting backbone and can be daisy-chain wired via CAT-5 cabling to other devices in the zone. Wall unit occupancy sensors may operate with line voltage or low voltage. Both low and line voltage units include a manually-operable push button switch 850, an occupancy sensor 852, and an LED (light emitting diode) 854 to indicate that the sensor is functioning. Occupancy sensor 852 can be programmed to operate with either passive infrared (PIR) detection or both PIR and sound detection for rooms or areas with obstructions. (The PIR and sound detection technology may be the same as that disclosed in, for example, U.S. Pat. No. 5,701,117, which is hereby incorporated by reference). Line voltage units also include a relay and may be provided with 2-pole operation. The 2-pole units include two relays and can be used for inboard/outboard switching applications and multi-level lighting control applications. That is, they can be used for "A-B switching" as follows: full on, only load A on, only load B on, or all off. Separate time delays and switch functions can be programmed for each pole, enabling almost countless configuration options. For example, one of these sensor units can be used to control a light and a fan, and the sensor unit can be set to operate each with a different time delay. Also, these 2-pole units can handle applications with multiple loads and voltages, such as, for example, a restroom with 277 VAC lighting and a 120 VAC exhaust fan. The settings for each pole can be programmed either at the device or via the lighting control software either at the host computer or a computer or handheld device with remote access to the LAN. The line voltage wall switch sensor unit may optionally include a night light, which is preferably a white LED integrated with push button switch 850. The default operational mode of the night light wall switch sensor unit is preferably manual on to semi-automatic. The default operational mode of the other wall switch sensor units is preferably fully automatic (automatic on/automatic off). The wall switch sensor units can be programmed (or reprogrammed) locally via the front push button switch 850, a gateway, or remotely via the lighting control software to operate in any of the other advanced modes described above.

In sum, combinations of wall units can be used together to create lighting control zones with multiple switching locations and functionalities.

In addition to the wall switch sensor units, the lighting control system of the invention includes several other types of occupancy sensors with different sensing capabilities to provide occupancy detection for rooms and areas having a wide variety of characteristics and configurations. The different types include ceiling mounted 360° sensors for placement in areas such as private offices, vestibules, or small rooms. In one embodiment, the sensor provides about 12 ft of radial coverage when mounted to a standard 9 ft ceiling. Sound can be detected up to about 20 ft and more in spaces with hard floors or low background noise. Other types of occupancy sensors include ceiling mounted extended range 360° sensors for placement in large rooms or areas: high bay 360° sensors for placement in areas with high ceilings such as warehouses, racquetball courts, and gymnasiums: corner or ceiling mounted wide view sensors for placement in areas such as classrooms; and wall or ceiling mounted hallway sensors for placement in long narrow areas such as hallways or corridors. U.S. Pat. No. 6,215,398 and U.S. Pat. No. 6,304,180 each disclose occupancy sensing technologies that may be used by the occupancy sensors of the invention and are thus hereby incorporated by reference.

All occupancy sensors of the invention have integrated microcontrollers and firmware, two preferably RJ-45 connector ports, the ability to communicate over the network backbone, and the ability to operate with PIR detection technology alone or both PIR and sound detection technology. Occupancy sensors can be connected to other devices such as power packs, wall units, and daylight sensors in a daisy-chain manner using CAT-5 cabling, and are available in low voltage and line voltage embodiments. Low voltage sensors do not have a relay and thus send their information to relays located elsewhere within the zone, while line voltage sensors have an integrated relay that they can control. Advantageously, the integrated relay in a line voltage sensor is not required to switch its zone's lighting, but can instead be used as a signal relay to another system. Multiple occupancy sensors can be used in the same zone to provide coverage for oddly shaped rooms or large open areas. Each occupancy sensor can be programmed either locally via a push button on each sensor or remotely via the lighting control software.

Occupancy sensors of the invention provide either a single level of lighting control or two independent levels of lighting control via 2-pole embodiments of the sensors. For example, overhead lights may be controlled by the first pole of a sensor, while an exhaust fan may be controlled by the second pole. Each pole can be given its own time delay. Thus, continuing with the lights and fan example, the lights can be set to turn off 10 minutes after the last person leaves, while the exhaust fan can be set to continue running for 20 minutes after the last person leaves. Also, if a fan is shared between two restrooms, installing a 2-pole sensor in each restroom with the second poles wired in parallel will cause the fan to turn on if either room is occupied. Multi-level lighting control is also possible with 2-pole sensors. For example, a first group of lights can be controlled by the first pole and a second group of lights can be controlled by the second pole. Four lighting levels are thus possible: all lights on, only the first group on, only the second group on, and all lights off.

Figure 9:
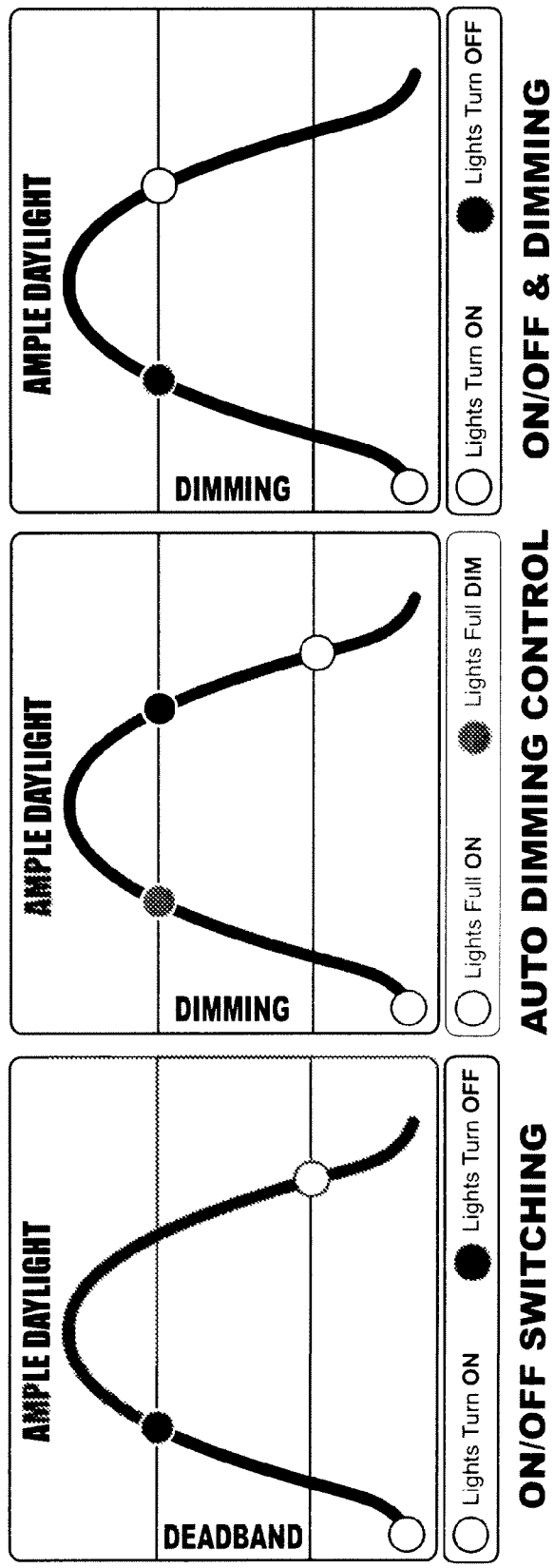
FIGS. 9A-C illustrate various exemplary embodiments of daylight sensing modes according to the invention.

The lighting control system of the invention also provides daylight sensors to provide intelligent control of lighting in defined areas with windows, such as, for example, vestibules, corridors, classrooms, or offices, that receive sufficient daylight such that a lighting device can be turned off or at least dimmed. Daylight sensors monitor daylight conditions via a photocell and can control one or more lighting devices to ensure that adequate lighting levels are maintained. Daylight sensors of the invention have an integrated microcontroller with firmware and thus do not need a separate control unit. Daylight sensors operate using a single set-point with automatic set-point programming that requires only one installation visit. Calibration can be done at any time of the day. Daylight sensors automatically adapt to changes in room lighting conditions (e.g., lamp aging or burn out) and determine the amount daylight present. Daylight sensors of the invention can communicate over the network backbone and can be daisy-chain wired within a lighting control zone via CAT-5 cabling to other devices of the invention such as power packs, wall units, and occupancy sensors. Once linked to a gateway, the sensor can be remotely monitored, upgraded, and controlled via the lighting control software. Embodiments include low voltage daylight sensors that do not have internal relays and accordingly send their information to relays located elsewhere within the zone, and line voltage daylight sensors that have a relay integrated within the sensor that they can control. Daylight sensors of the invention may provide on/off functionality, dimming functionality, or both, as illustrated in FIGS. 9A-C. To provide on/off functionality, daylight sensors control relays to connect/disconnect line voltage to one or more lighting devices. To provide dimming functionality, daylight sensors control 0-10 VDC dimmable ballasts of lighting devices by issuing dimming commands to the ballasts over low voltage wiring. Daylight sensors are 2-pole devices (but alternatively can be single pole) that have a second output to separately control an additional load or a second group of lighting devices in the lighting control zone. The set point for the second output can be a percentage of the first pole's set-point. Also, a second 0-10 VDC dimmable ballast can be controlled by the second output at a selected daylight level higher than that used for a first 0-10 VDC dimmable ballast controlled by the first output. The sensor determines the necessary on/off combination of the two poles in order to maintain adequate lighting.

Figure 10:
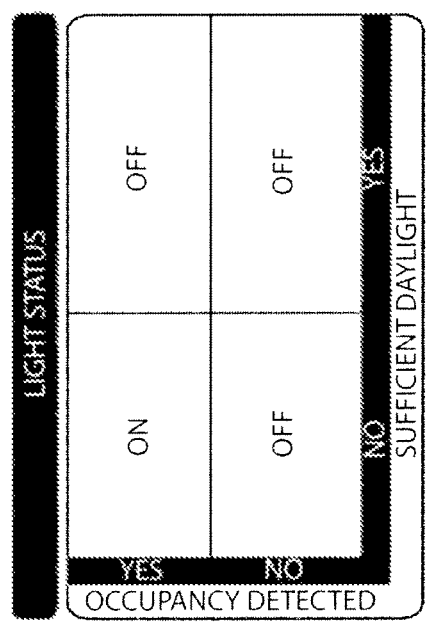
FIG. 10 illustrates an exemplary embodiment of joint control of a lighting device by both an occupancy sensor and a daylight sensor according to the invention.

Daylight sensors can be used with occupancy sensors to achieve even greater energy savings. In one embodiment, lighting control decisions are made using occupancy as the primary factor and daylight as the secondary factor, as shown in FIG. 10.

Figure 11:
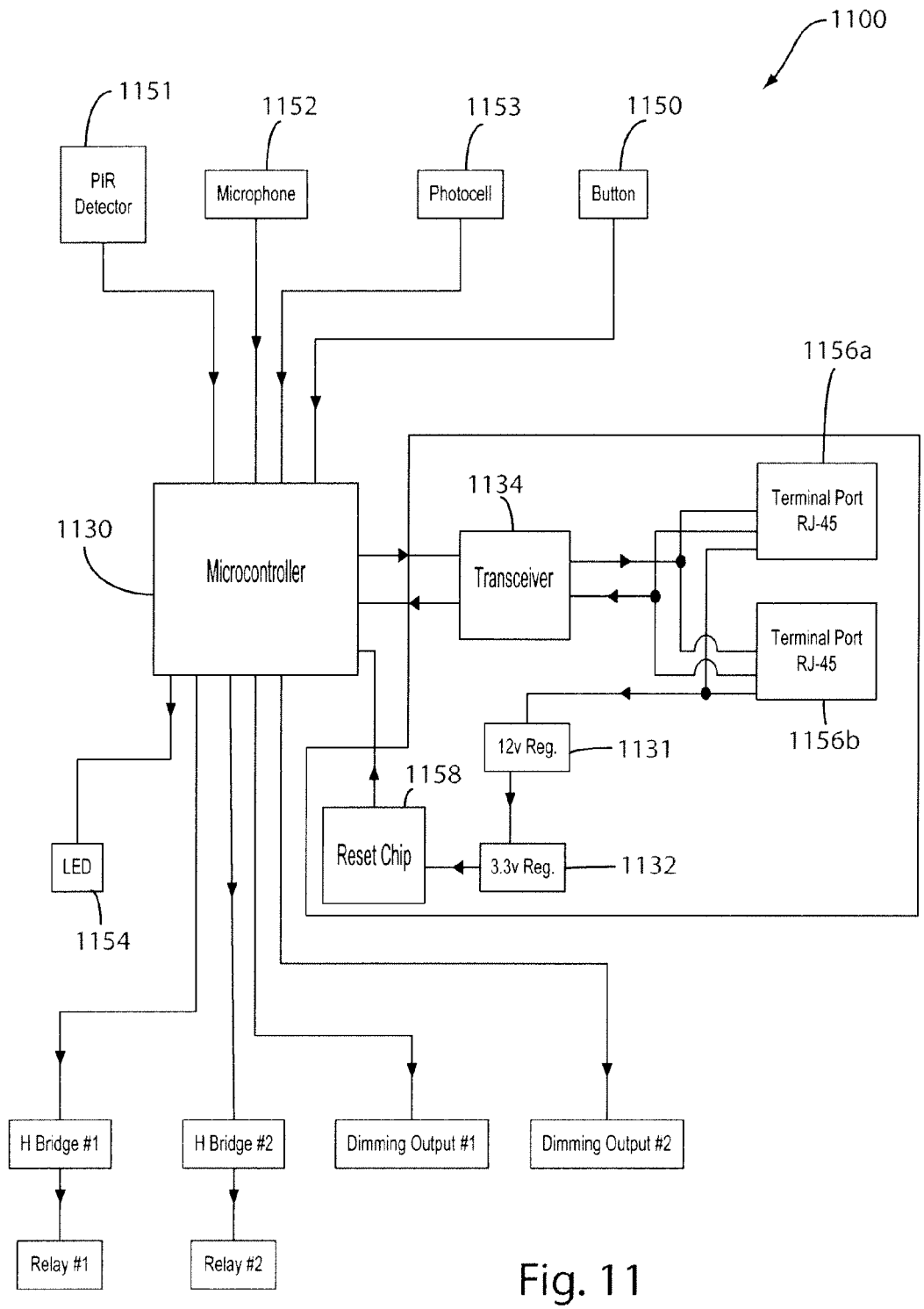
FIG. 11 is a block diagram of an exemplary embodiment of occupancy and daylight sensors according to the invention.

FIG. 11 shows a basic hardware configuration of both occupancy and daylight sensors according to the invention. Sensor 1100 includes a microcontroller 1130, voltage regulators 1131 and 1132, transceiver 134, push button 1150, PIR detector 1151, sound detector (microphone) 1152, daylight detector (photocell) 1153, LED 1154, connector ports 1156a and 1156b, reset chip 1158, H-bridges #1 and #2, relays #1 and #2, and dimming outputs #1 and #2. Reset chip 1158 monitors the preferably 3.3 volts from regulator 1132 and disables the microcontroller via a reset pin if the voltage falls below a set level, such as, for example, 2.8 volts. This prevents the microcontroller from possibly malfunctioning or locking up should its input voltage drop below a certain level. The H-bridges provide the sensors with reversible relay logic. That is, the H-bridges are circuits that allow current to pass in either direction (i.e., either polarity) through the relay coil to allow the rely to be thrown in either direction. Microcontroller 1130 is preferably a Texas Instruments MSP430F2272, transceiver 1134 is preferably an RS-485 Analog Devices ADM3493, and reset chip 1158 is preferably a TelCom Semiconductor TC54VN27 voltage detector. Note that the various embodiments of the sensors described above may not have all of the sensing and output components shown in FIG. 11. For example, some sensors may have no relays or only one relay. Other sensors may have no dimming output or only one dimming output. While still other sensors may not have daylight detector (photocell) 1153, and others may not have PIR detector 1151 and/or sound detector (microphone) 1152.

Figure 12:
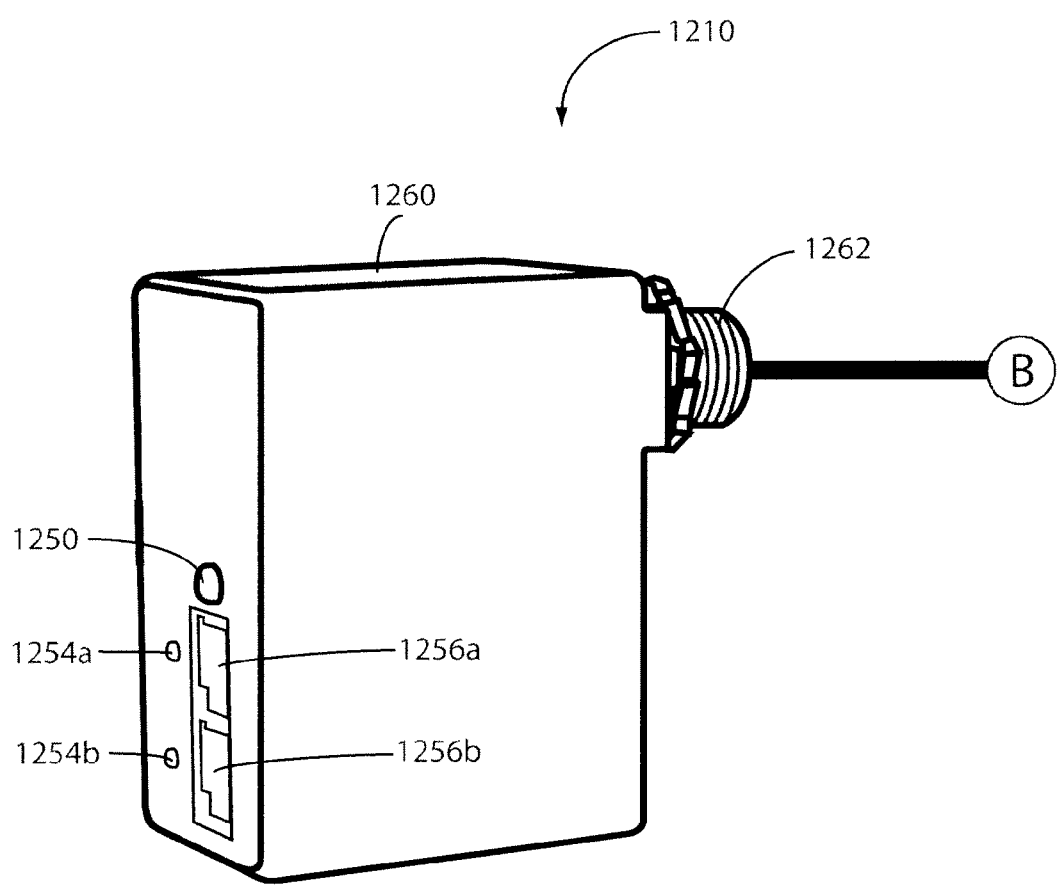
FIG. 12 is a perspective view of an exemplary embodiment of a power pack according to the invention.
Figure 13:
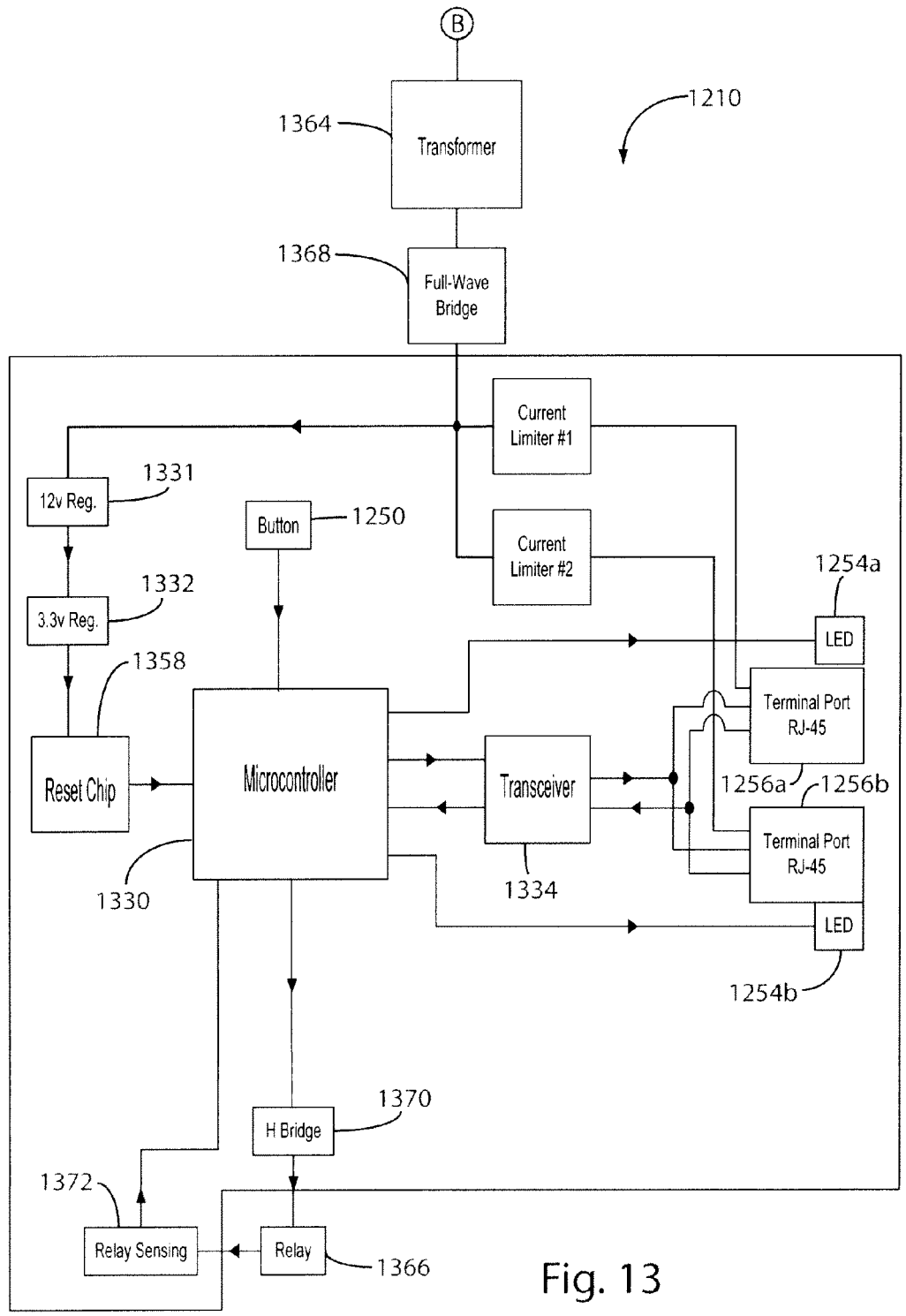
FIG. 13 is a block diagram of an exemplary embodiment of a power pack according to the invention.

Power packs of the invention include a transformer and a relay to provide two important functions to the lighting control system: supplying power to other devices and switching lighting loads. FIGS. 12 and 13 show a power pack 1210 in accordance with the invention. Power pack 1210 has housing 1260, two preferably RJ-45 connector ports 1256a,b that can be daisy-chain wired using CAT-5 cabling to other devices (e.g., sensors and/or wall units) to form a lighting control zone, and two LED indicators 1254a,b to indicate connector functionality. For simplifying installation, power packs also have an elongated chase nipple 1262 that allows them to be attached either directly through a ½" knockout into a junction box, or inside an adjacent box for meeting specific local code requirements in ceiling plenums. Line voltage Class 1 wiring B is received through chase nipple 1262. To provide system power, transformer 1364 transforms Class 1 line voltage (120/277/347 VAC) to Class 2 15 VDC. The power provided by a power pack enables a lighting control zone to operate independently of the lighting control software or connection to any other device outside the zone. For switching a lighting load, an internal preferably 16A latching relay 1366 is used. Power packs, like other devices of the invention, have a microcontroller 1330 and transceiver 1334 for communicating over the network backbone of the invention. Power pack 1210 also includes a full-wave rectifier 1368, current limiter #1, current limiter #2, voltage regulators 1331 and 1332, reset chip 1358, H-bridge 1370, and relay sensor 1372. Microcontroller 1330 is preferably a Texas Instruments MSP430F2272, transceiver 1334 is preferably an RS-485 Analog Devices ADM3493, and reset chip 1358 is preferably a TelCom Semiconductor TC54VN27 voltage detector.

A power pack's transformer supplies up to 40 mA of current (i.e., "power") to each of its two RJ-45 ports for distribution to a lighting control zone and beyond. Because sensors and other devices within a lighting control zone typically require less then 2 mA each, a power pack can usually power its entire control zone with power to spare. The remaining power is made available over the network to other zones and devices (e.g., bridges and gateways).

Power packs can be remotely configured and upgraded (i.e., their firmware) and are push-button programmable via push button 1250. The lighting control software can program settings for each power pack individually. Operational settings for power packs include override lights on or off; track/ignore occupancy sensors, manual switches, and/or daylight sensors; and occupancy, daylight, or switch source channel designation. By factory default, power packs are configured to respond to all occupancy, photocell, and switch commands arriving on channel 1, but can be reconfigured to respond to either channel 1 or channel 2 via their source channel setting. Power packs can also participate in the following advanced control modes: manual on to semi-automatic, manual on to fully automatic, manual on to override on, and predictive off.

A modified embodiment of the power pack is the slave pack. A slave pack includes the same switching relay as the power pack, but does not have a transformer. Thus, it can switch line voltage to and from a load via the relay, but only receives and distributes power via CAT-5 cabling through its RJ-45 connector ports. The housing and other external features of the slave pack are identical to power pack 1210. Slave packs, like other devices of the invention, also have a microcontroller and transceiver for communicating over the network backbone of the invention.

Another related device of the invention is the auxiliary relay pack. An auxiliary relay pack provides switching of low voltages primarily for interfacing with devices or control systems outside the invention. In one embodiment, the auxiliary relay pack has a rated switching load of 1A at 40 VAC/VDC. The housing and other external features of the auxiliary pack are identical to power pack 1210. Auxiliary packs, like other devices of the invention, have a microcontroller, transceiver, and two preferably RJ-45 connector ports for communicating over the network backbone of the invention.

The lighting control system also includes a power supply unit that supplies power to the devices of the system. Power supplies have transformers but, unlike power packs, do not have relays. One embodiment of the power supply has two preferably RJ-45 ports and makes its power available to other devices via CAT-5 cabling. Another embodiment of the power supply connects directly to terminal inputs on a bridge or gateway via Class 2 wiring. Both embodiments supply up to 150 mA at 15 VDC. The housings and external features of the two power supply embodiments are identical or substantially similar to those of power pack 1210. For example, both embodiments have a chase nipple for simplifying installation. These power supply devices do not, however, communicate with any other devices or the lighting control software.

The lighting control system of the invention also includes a transceiver/power supply that provides a wireless access point for a gateway or a lighting control zone that cannot be directly wired into a bridge. The transceiver/power supply also provides system power by transforming Class 1 line voltage (120/277/347 VAC) to Class 2 15 VDC. Both power and communication are supplied via the unit's two preferably RJ-45 connector ports, which can be used to connect to other devices via CAT-5 cabling. The housing and other external features of the transceiver/power supply are identical to power pack 1210. For example, the transceiver/power supply is also push-button programmable and has LED status indicators. In one embodiment, the transceiver/power supply supplies up to 250 mA of current. When wired to a gateway, this amount meets the 60-80 mA requirement of one embodiment of the gateway and provides the remaining 170-190 mA to other devices and/or zones. When wired to a lighting control zone, sufficient power for the entire zone is easily provided by this unit, as each zone device typically requires 2 mA or less. The transceiver/power supply operates wirelessly at 2.4 GHz and preferably is capable of joining and participating with other transceiver/power supplies and wireless bridges of the invention in a ZigBee® wireless mesh network. If the transceiver/power supply's RJ-45 ports are not wired to a gateway or lighting control zone, the unit will continue to participate in the mesh network as a stand-alone wireless "repeater." This feature is used to span long hops between other wireless devices of the invention.

Figure 14:
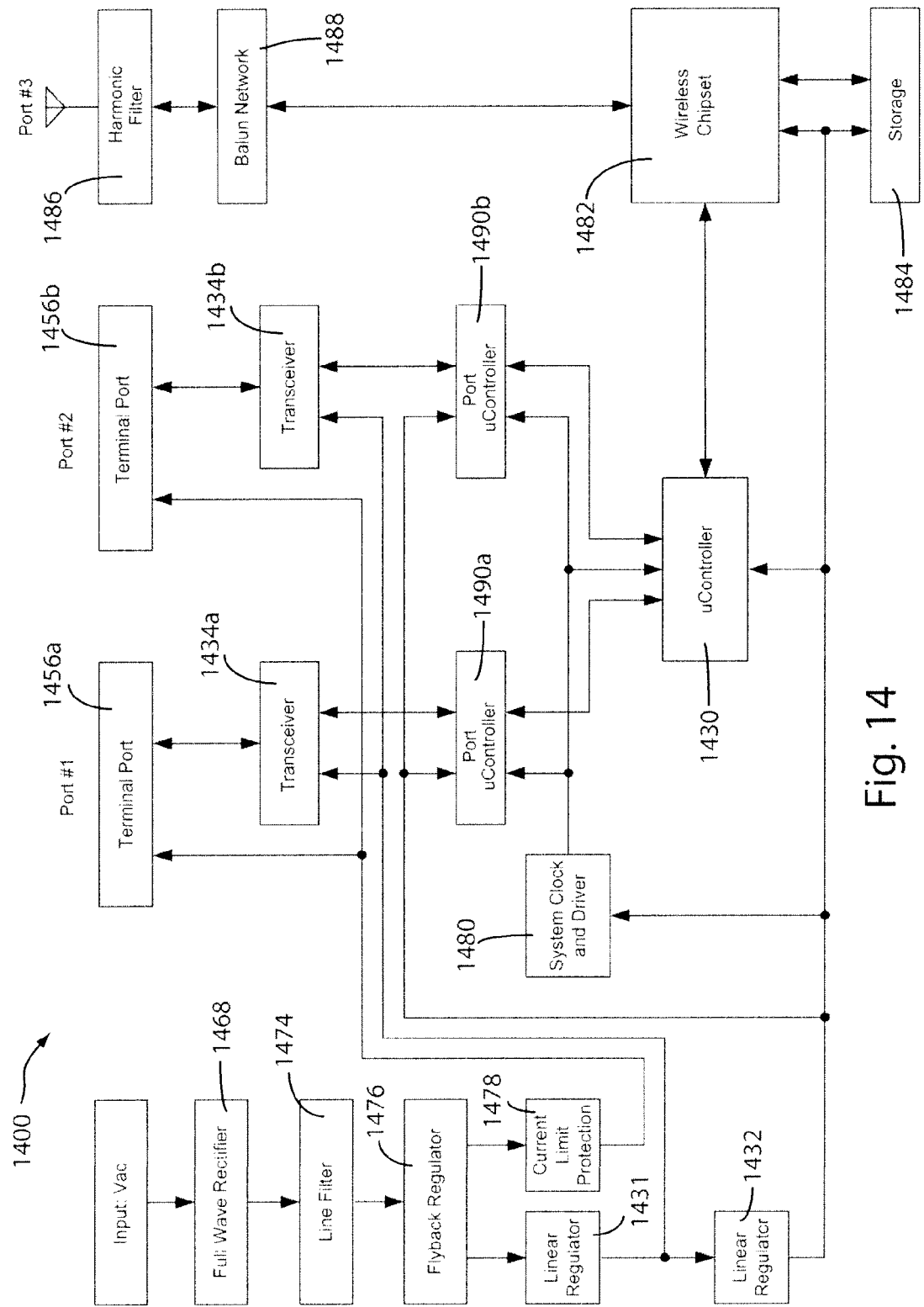
FIG. 14 is a block diagram of an exemplary embodiment of a transceiver/power supply according to the invention.

FIG. 14 shows a hardware embodiment of a transceiver/power supply in accordance with the invention. Transceiver/power supply 1400 includes a full wave rectifier 1468, line filter 1474, and flyback regulator 1476. Full wave rectifier 1468 receives line voltage and has a standard arrangement of power diodes to convert an AC (sinusoidal) input waveform to an all positive signal waveform. Rectifier 1468 also has a capacitor to store converted DC power. The stored DC voltage is typically 169 VDC (for 120 VAC), 391 VDC (for 277 VAC) and 490 VDC (for 347 VAC). Line filter 1474 includes a common mode choke (e.g., a J W Miller 7346-V-RC) and several line voltage ceramic capacitors arranged to form a pi filter. This filter ensures compliance with FCC conducted emissions limits. Because transceiver/power supply 1400 uses high frequencies, filter 1474 ensures that the supply power line is not impaired with transients that could potentially cause other devices using the same supply to become inoperative. Flyback regulator 1476 includes a switching regulator integrated circuit (e.g., ON Semiconductor NCP1011), custom magnetic transformer, high speed switching diodes, and storage capacitors. The selected switching regulator uses a switching frequency of approximately 65 kHz. Because of the operating frequency of the regulator, the physical size of the transformer is only about 20% of that required by 50/60 Hz transformers.

Transceiver/power supply 1400 also includes current limiter 1478, linear voltage regulators 1431 and 1432, system clock and driver 1480, microcontroller 1430, wireless chipset 1482, which is preferably ZigBee® chipset EM250, storage 1484, harmonic filter 1486, balun network 1488, two preferably RJ-45 connector ports 1456*a,b*, two transceivers 1434*a,b*, and two port controllers 1490*a,b*. In one embodiment, current limiter 1478 allows a total of 250 mA to be shared between the two connector ports 1456*a,b*. Communication between transceivers 1434*a,b* and port controllers 1490*a,b* preferably adheres to the RS-232 standard for serial binary data signals. The transceivers are preferably RS-485 National Semiconductor Corporation DS36C278 transceivers, port controllers 1490*a,b* are preferably Silicon Laboratories 8051F305 microcontrollers, and microcontroller 1430 is preferably a Silicon Laboratories 8051F346 microcontroller. Wireless chipset 1482, harmonic filter 1486, and balun network 1488 represent the circuitry for wireless communication to and from the transceiver/power supply 1400. Data is transmitted at preferably 2.4 GHz and adheres to preferably the IEEE 802.15.4 wireless low data rate PAN (personal area network) standard. The digital modulation technique for transmitting digital data is preferably O-QPSK (offset quadrature phase shifting key).

Bridges of the invention are integral components of the network backbone. They increase the number of lighting control zones that can be connected to the system and act as a hub by aggregating traffic from connected downstream lighting control zones and placing that traffic onto the backbone. Bridges also act as routers by forwarding information from the backbone to the applicable downstream zones. In particular, bridges route data packets received from either a gateway, the lighting control software via a gateway, or a scene controller wall unit (described below) to their final destination. Using a proprietary protocol that includes destination and source addresses, a bridge will pass a data packet received on its upstream port to a device connected on a downstream port or to another bridge if the destination device is not directly connected to this bridge. Because the packet is repeated on the downstream port, signal integrity is reaffirmed. Also, the bridge will check for an outbound packet generated by a device (such as the scene controller wall unit) and will route that packet where it needs to go. Bridges respond to packets addressed to them, just like other devices. Some examples of the information a bridge would transmit in a response packet are name, product code, date code, software #, firmware update, and microcontroller information such as the number of reboots, the number of saves to memory, or the voltage of the microcontroller. Bridges also individually poll each connected device for status and may receive a packet which contains, for example, time delay remaining, photocell reading, switch exertion, etc. This status is made known to every other device in the zone. Devices use this information to control their individual outputs (i.e., relay or dimming level). Note, however, only devices within the same lighting control zone receive each other's polling status response.

Figure 15:
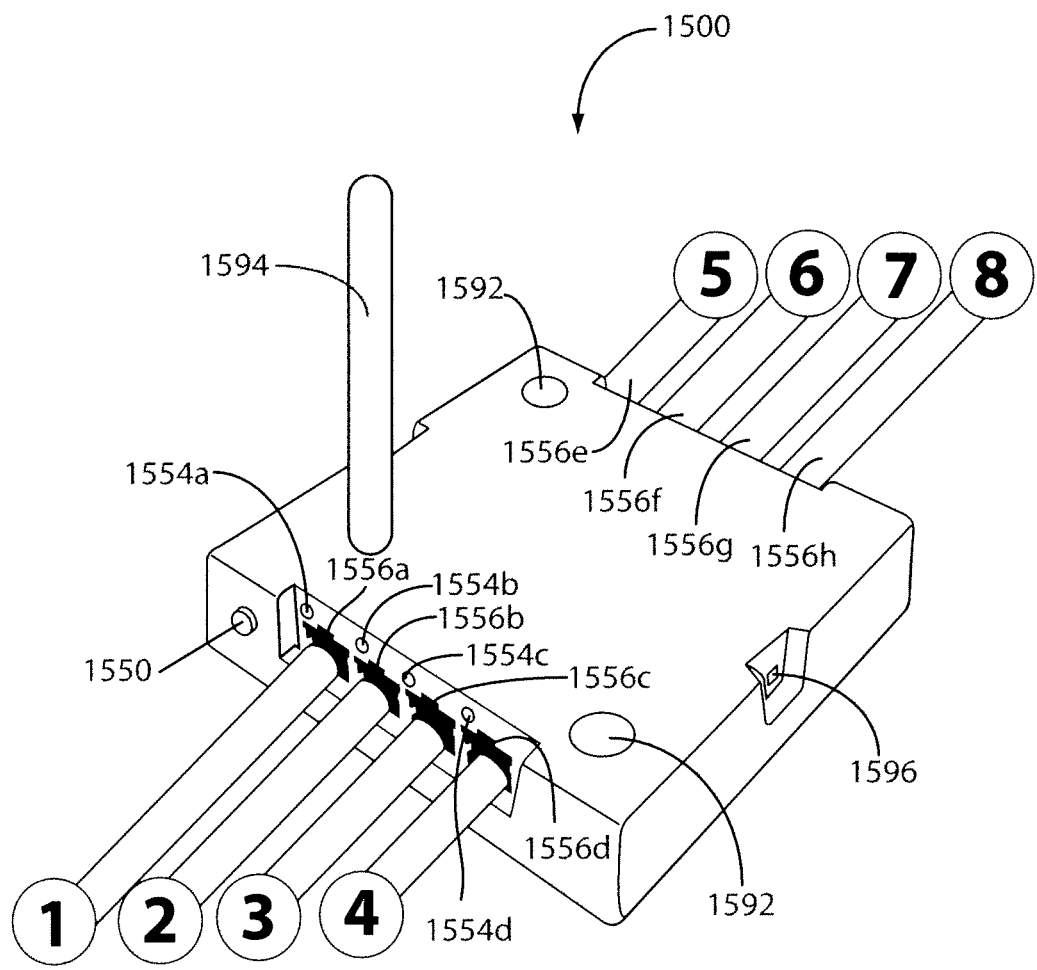
FIG. 15 is a perspective view of an exemplary embodiment of a bridge according to the invention.
Figure 16:
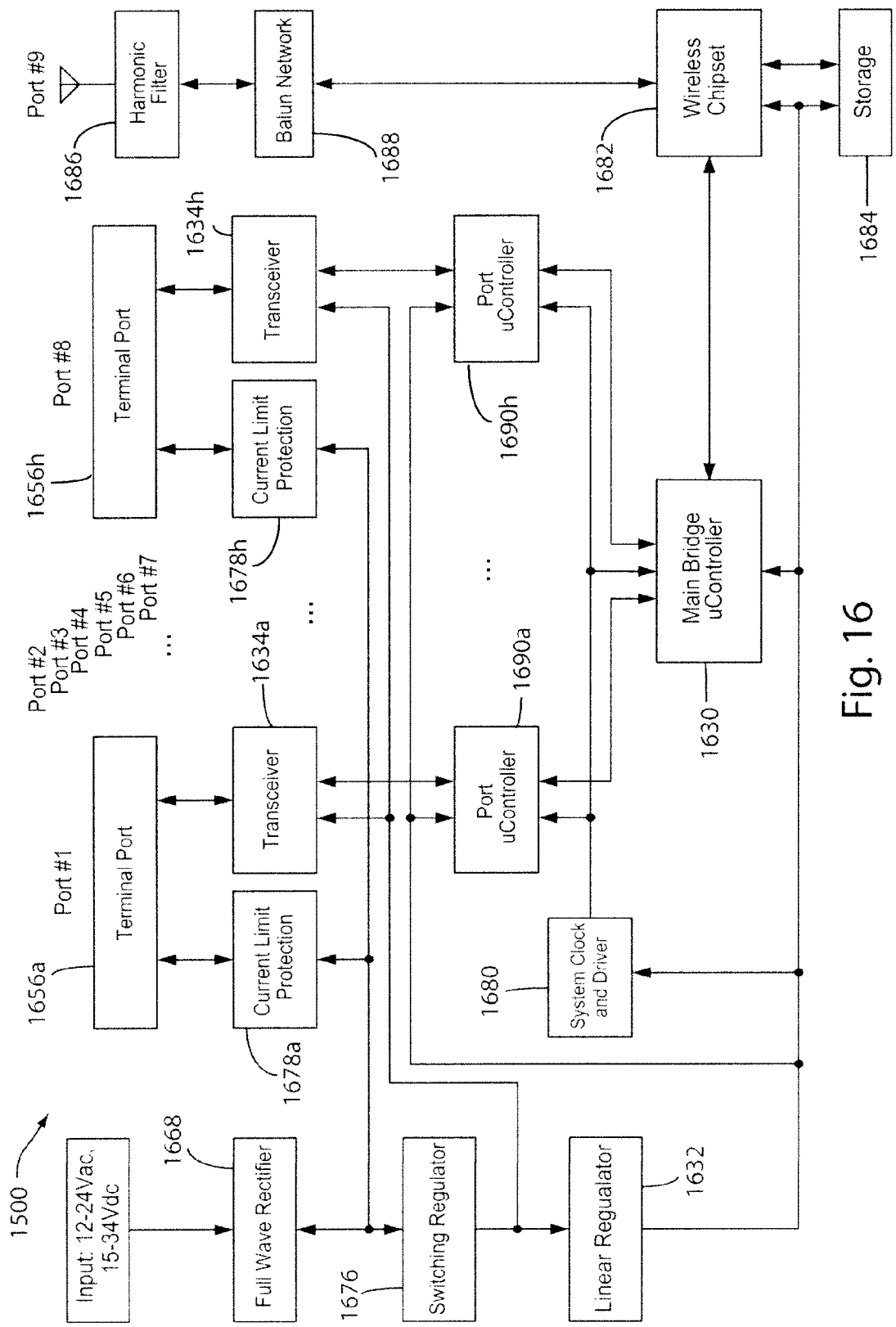
FIGS. 16 and 17 are block diagrams of respective embodiments of a bridge according to the invention.

FIGS. 15 and 16 show embodiments of a bridge in accordance with the invention. Bridge 1500 has two mounting screw holes 1592 for convenient mounting directly onto a common 4"×4" electrical junction box. Bridge 1500 also has eight preferably RJ-45 connector ports 1556a-h into which lighting control zones of daisy-chain wired devices of the invention can be connected via CAT-5 cabling. Each connector port can connect to one lighting control zone. That is, one port per zone. Thus, a bridge can directly connect to at most eight lighting control zones. Each connector port has an associated LED indicator to show communication activity, which means, for example, that a zone connected to a port is up and running. This quickly points out CAT-5 wiring mistakes that may have been made on installation and shows if a device is short circuited. Note that only LED indicators 1554a-d are shown in FIG. 15. The bridge also can be connected to another bridge or to a gateway via CAT-5 cabling though one of its connector ports. Alternatively, bridge 1500, which includes antenna 1594, can be linked wirelessly to other bridges 1500 or gateways via its RF (radio frequency) wireless communication capability. The wireless communication preferably adheres to the ZigBee® mesh network protocol, and in one embodiment, bridges transmit at 2.4 GHz.

As shown in FIG. 16, bridge 1500 includes a full wave rectifier 1668, which in one embodiment receives either 12-24 VAC or 15-34 VDC; switching regulator 1676; linear regulator 1632; system clock and driver 1680; microcontroller 1630; wireless chipset 1682, which is preferably ZigBee® chipset EM250; storage 1684; harmonic filter 1686; balun network 1688; eight preferably RJ-45 connector ports 1656 (note only two are shown, ports 1656a,h); eight current limiters 1678 (note only two are shown, limiters 1678a,h); eight transceivers 1634 (note only two are shown, transceivers 1634a,h); and eight port controllers 1690 (note only two are shown, controllers 1690a,h). Communication between the transceivers 1634 and port controllers 1690 preferably adheres to the RS-232 standard for serial binary data signals. The transceivers are preferably RS-485 National Semiconductor Corporation DS36C278 transceivers, port controllers 1690 are preferably Silicon Laboratories 8051F305 microcontrollers, and microcontroller 1630 is preferably a Silicon Laboratories 8051F340 microcontroller. Wireless chipset 1682, harmonic filter 1686, and balun network 1688 represent the circuitry for wireless communication to and from bridge 1500. Data is transmitted at preferably 2.4 GHz and adheres to preferably the IEEE 802.15.4 wireless low data rate PAN (personal area network) standard. The digital modulation technique for transmitting digital data is preferably O-QPSK (offset quadrature phase shifting key).

Bridge 1500 has a push button 1550 to activate the self-commissioning process, wherein the bridge automatically discovers and stores the unique serial number of each device attached to it. In one embodiment, a bridge is capable of storing 128 devices per port, for a maximum total of 1,024 devices (i.e., 8 ports×128 devices=1024 devices). If more than 128 devices are connected on a port, the remainder will be ignored. The bridge sends the collected serial numbers to a gateway for use with the lighting control software. This data packet may also include the bridge's serial number and the connector port number to which each device is connected. With this information, the lighting control software can display a device tree that shows how all the devices are connected in the entire system. A bridge also detects if a device stops responding and thus needs to be deleted from a gateway's list. If a device fails to respond to a certain number of polls, it is deleted from memory and a packet is sent to the gateway. A device would fail to respond if it is malfunctioning or its CAT-5 cabling is cut or unplugged from a connector port.

Figure 17:
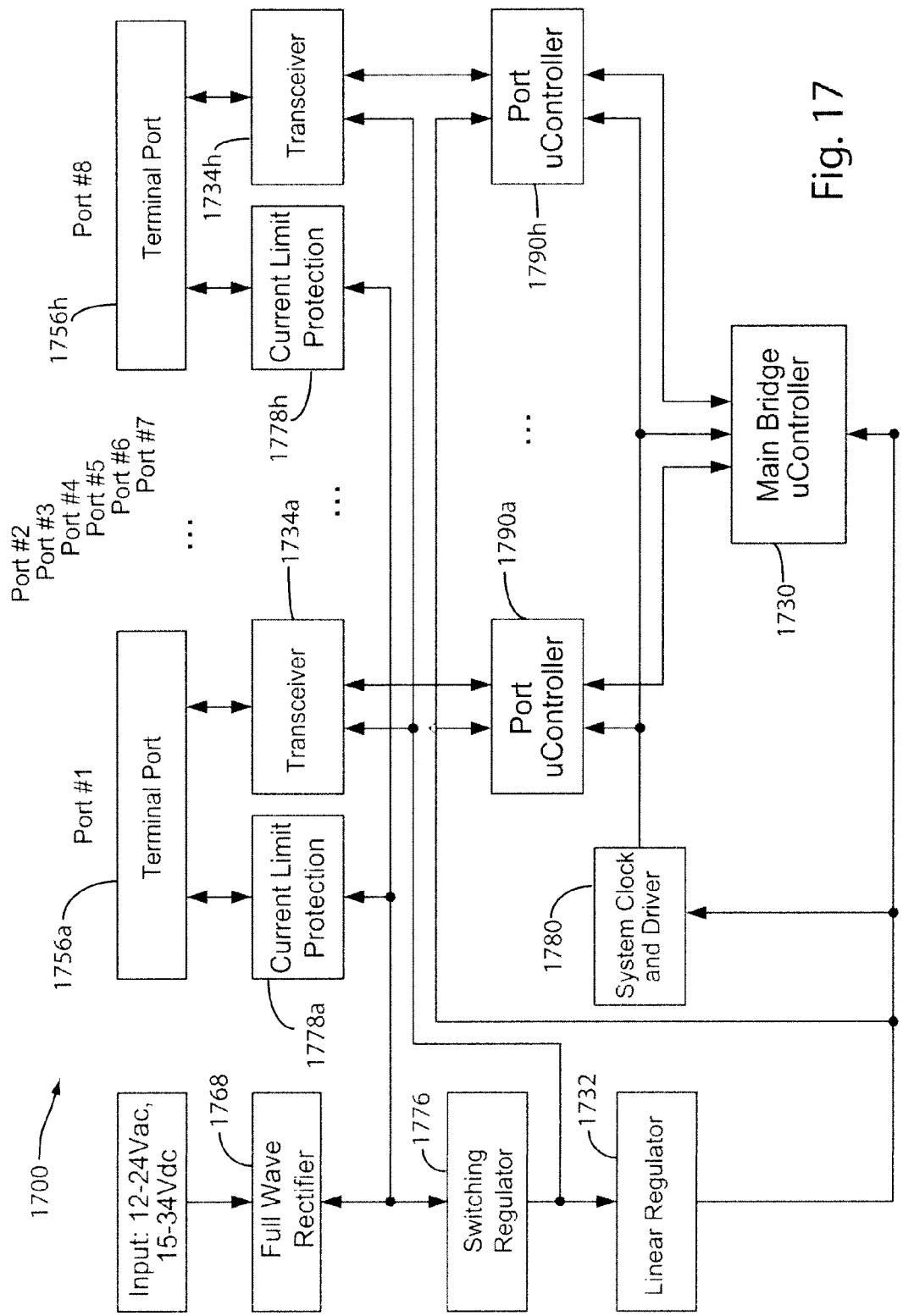

FIG. 17 shows a second hardware embodiment of a bridge, which is identical to bridge 1500 except that it does not have wireless communication capability. Thus, bridge 1700 does not have an antenna or circuitry for wireless communication (i.e., no wireless chipset, harmonic filter, and balun network). Bridge 1700 does, however, have all the other functions and features as bridge 1500 and includes a full wave rectifier 1768, which in one embodiment receives either 12-24 VAC or 15-34 VDC; switching regulator 1776; linear regulator 1732; system clock and driver 1780; microcontroller 1730; eight preferably RJ-45 connector ports 1756 (note only two are shown, ports 1756a,h); eight current limiters 1778 (note only two are shown, limiters 1778a,h); eight transceivers 1734 (note only two are shown, transceivers 1734a,h); and eight port controllers 1790 (note only two are shown, controllers 1790a,h). Communication between transceivers 1734 and port controllers 1790 preferably adheres to the RS-232 standard for serial binary data signals. The transceivers are preferably RS-485 National Semiconductor Corporation DS36C278 transceivers, port controllers 1790 are preferably Silicon Laboratories 8051F305 microcontrollers, and microcontroller 1730 is preferably a Silicon Laboratories 8051F340 microcontroller.

Figure 18:
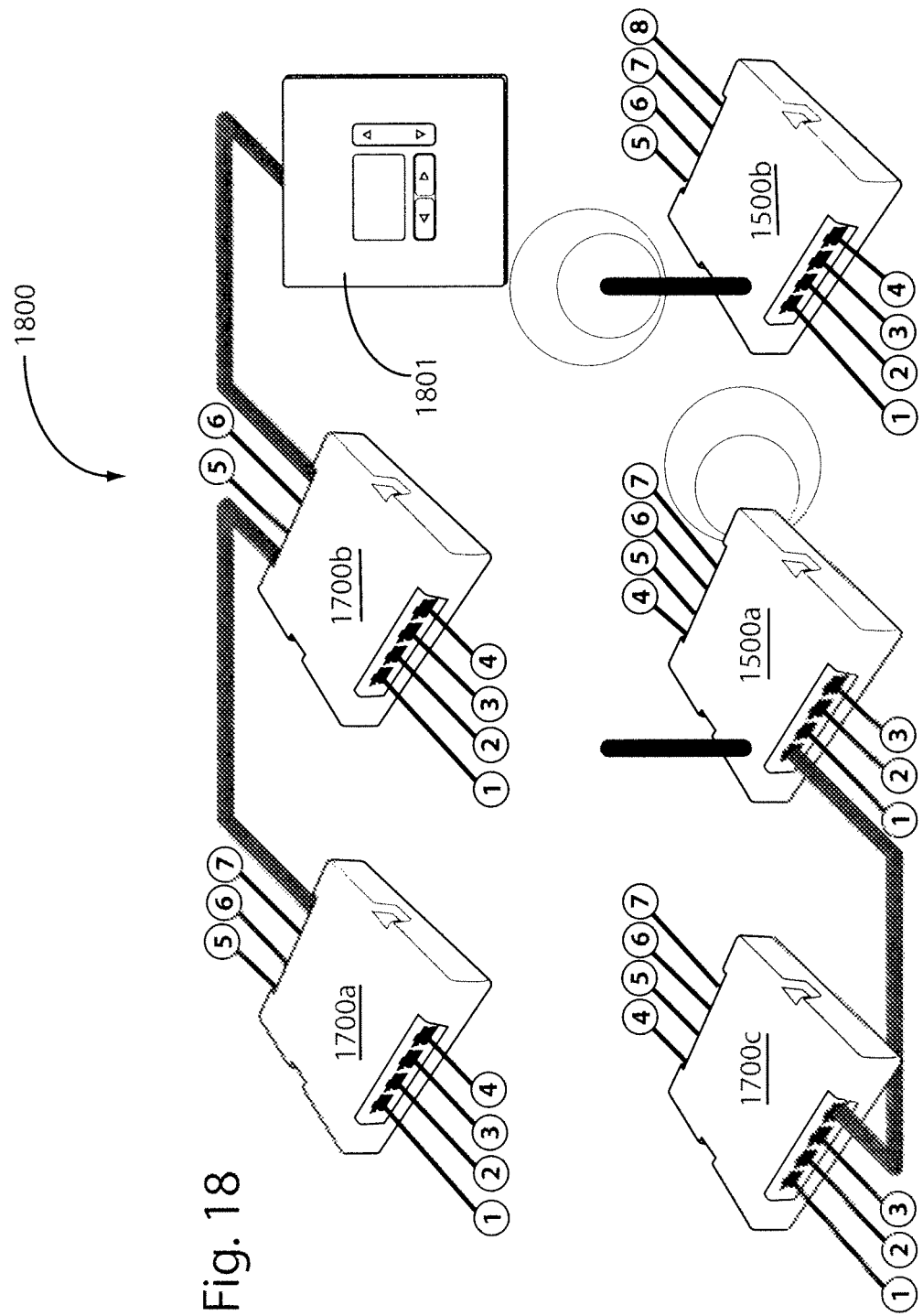
FIG. 18 illustrates an exemplary embodiment of a network configuration of bridges and a gateway according to the invention.

FIG. 18 shows a representative network configuration of bridges and a gateway in accordance with the invention. In a first branch of network 1800, bridge 1700a connects to seven lighting control zones and to bridge 1700b via CAT-5 cabling. Bridge 1700b in turn connects to six lighting control zones and to gateway 1801 via CAT-5 cabling. In a second branch of network 1800, bridge 1700c connects to seven lighting control zones and to bridge 1500a via CAT-5 cabling. Bridge 1500a connects to seven lighting control zones via CAT-5 cabling and to bridge 1500b via wireless communication. Bridge 1500b in turn connects to eight lighting control zones via CAT-5 cabling and to gateway 1801 via wireless communication to either a wireless transceiver/power supply or other wireless bridge (neither shown) wired to gateway 1801. Thus in this embodiment, five bridges, two with wireless communication capability, advantageously connect 38 lighting control zones to the network backbone of the invention.

All device and communication power is delivered via the CAT-5 bus that interconnects zones and bridges. Power to the bus is supplied from power packs, power supplies, and/or bridges. In one embodiment, power supplies deliver about 150 mA, while power packs provide 40 mA from each of their two connector ports (80 mA total). Devices in a lighting control zone (e.g., sensors, wall units, slave packs, etc.) typically consume about 2 mA each. Thus, a power pack or power supply can often power more than a single lighting control zone, and each bridge embodiment can advantageously combine system power from lighting control zones that are net contributors of power (i.e., those with more than enough downstream power packs and power supplies) and distribute that power to lighting control zones that are net consumers of power (i.e., those with less than enough or no power packs or power supplies). This power distribution methodology advantageously allows lighting control zones with power packs or power supplies to run independently without connection to a gateway or bridge. Moreover, lighting control zones without power packs or power supplies can still function independently provided they are connected to a bridge.

There are two methods of directly powering a bridge: connecting the bridge's terminal connectors 1596 located on the side of the bridge housing to a power supply of the invention via CAT-5 wiring, or connecting one of the bridge's connector ports to either a power supply or a power pack of the invention via CAT-5 cabling. While directly connecting a power supply or power pack to a bridge is recommended, power can also be supplied from a power pack or power supply located elsewhere in the network. In one embodiment of the invention, bridges with wireless communication capability require about 90 mA, while those with only wired connection capability require about 60 mA. Power supplies of the invention can deliver about 150 mA. Excess current up to about 80 mA from a directly connected power supply can be distributed via the bridge's connector ports 1556, which in one embodiment is limited to a maximum of about 40 mA per port. Current limiters 1678 ensure that the current drawn from a port does not exceed the maximum amount. Demand for more current from a connector port results in a voltage decrease in order to maintain the current limit. Bridges also monitor the voltage on the CAT-5 cabling and send that information to the lighting control software. If voltage is too low (below 14 volts in one embodiment), the software indicates that more power packs or power supplies are needed in the system. Note that with respect to power distribution, a bridge has the same functionality as the transceiver/power supply except the transceiver/power supply is limited to two connector ports and has its own power supply.

Figure 19:
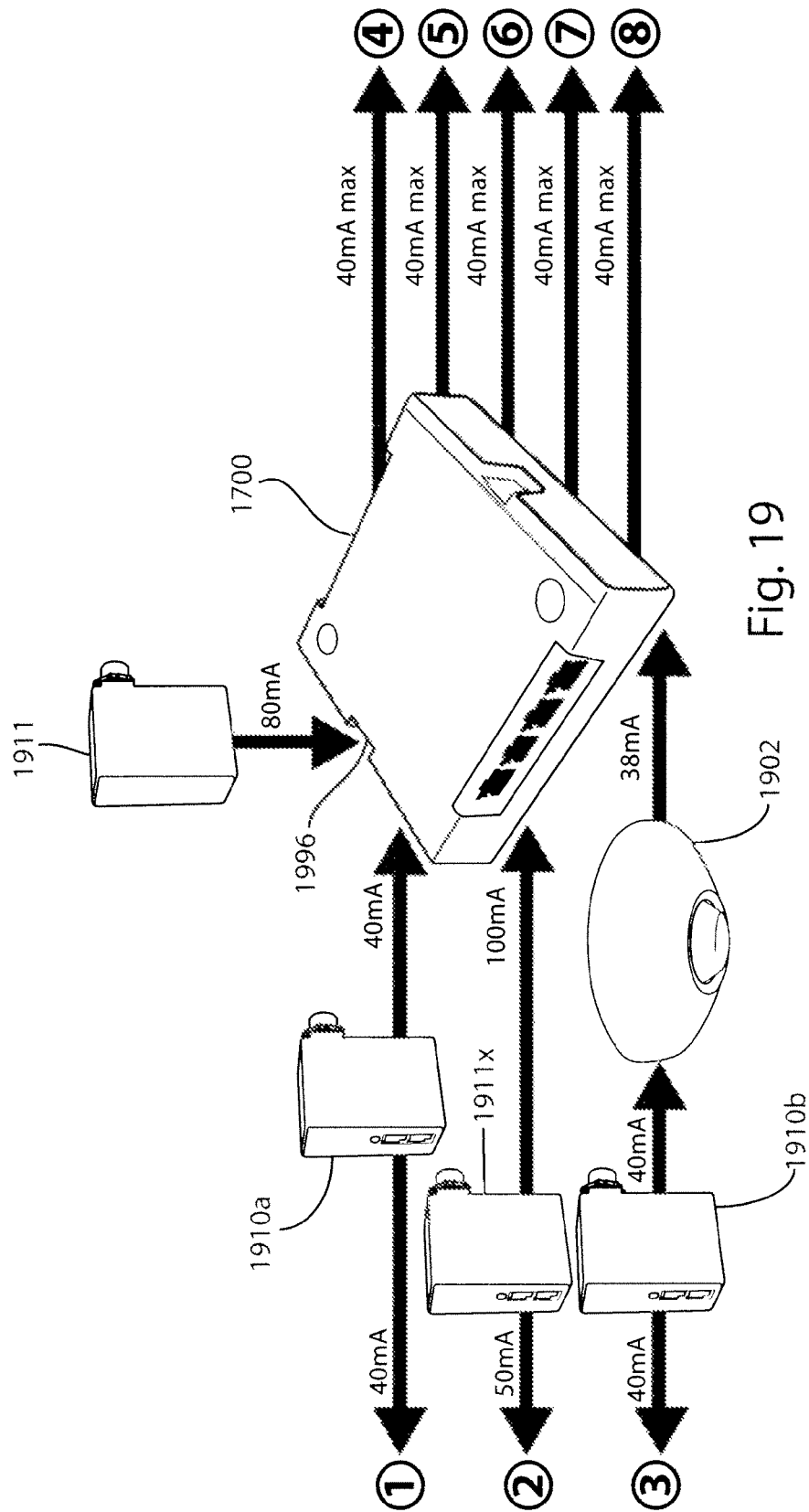
FIG. 19 illustrates an exemplary embodiment of power distribution with a bridge according to the invention.

FIG. 19 shows an example of power distribution in a lighting control system of the invention. Bridge 1700 is powered by a power supply 1911, which supplies about 150 mA to the bridge and is connected directly to the bridge's terminal connectors 1996 via Class 2 wiring. Of that amount, 80 mA are available for distribution. Power pack 1910a supplies 40 mA from one of its two ports to bridge 1700 via connection to one of the bridge's eight connector ports 1956, and supplies 40 mA to a first lighting control zone from the other port. A second power supply 1911X, which delivers power via CAT-5 cabling, provides 50 mA to a second lighting control zone and the remaining 100 mA of its total 150 mA output to bridge 1700 via connection to a second of the bridge's eight connector ports 1956. A second power pack 1910b provides 40 mA to the downstream devices of a third lighting control zone and provides 40 mA to upstream sensor 1902. Sensor 1902 consumes about 2 mA, delivering the remaining 38 mA to the bridge at a third bridge connector port 1956 for distribution to other devices and zones. In sum, bridge 1700 receives an additional 258 mA beyond its own needs, of which 200 mA total can be distributed to downstream lighting control zones and/or other bridges or a gateway via the five available connector ports 1956. If a bridge has less than the maximum amount of current per connector port available to distribute, the bridge divides the available current equally among its downstream connector ports and accordingly reduces the voltage at those ports (current=voltage divided by resistance).

Figure 20B:
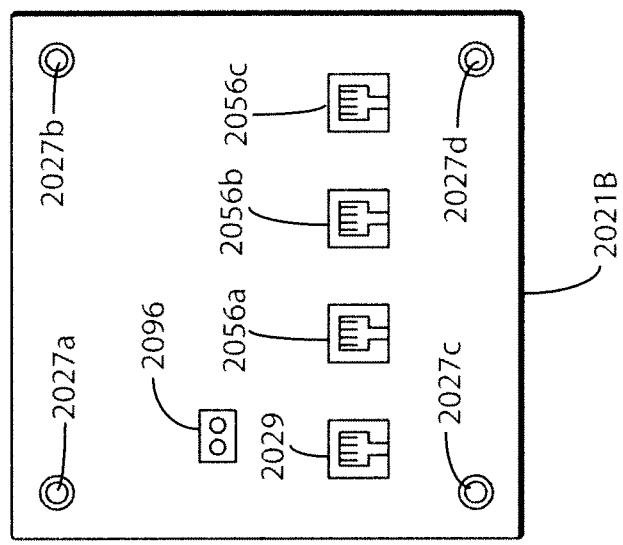
FIGS. 20A and B illustrate an exemplary embodiment of front and back panels of a gateway according to the invention.
Figure 20A:
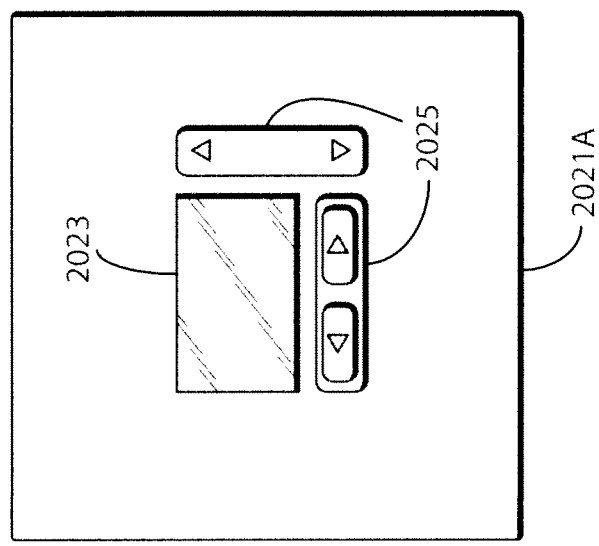

FIGS. 20A and B show the front and back panels of a gateway, respectively, in accordance with the invention. Gateways are part of the network backbone (along with bridges) that interconnect all lighting zones. Through the gateway, information running over the backbone is linked to the preferably Ethernet LAN where the host server resides, and backbone communication preferably adheres to standard Ethernet and TCP/IP communication protocols. The gateway communicates over the network backbone using CAT-5 wiring to any bridge, or by using a transceiver/power supply of the invention to establish a wireless connection to a wireless bridge. A gateway is a 2-gang low voltage wall unit that has four screw holes 2027a-d for mounting to a 2-gang junction box. A gateway acts as both a local control device and as the communication access point for the lighting control software.

Gateway front panel 2021A has a display screen 2023, which is preferably a backlit LCD (liquid crystal display) screen, and finger-touch controls 2025, which may alternatively be a conventional keypad. Back panel 2021B has a LAN connector port 2029, which is preferably a 10/100BaseT Ethernet port. LAN connector port 2029 is assigned an IP (Internet Protocol) address on the building's LAN where the lighting control software is located. This IP address can be fixed or assigned dynamically using DHCP (Dynamic Host Configuration Protocol). Back panel 2021B also has three preferably RJ-45 connector ports 2056a-c for connection to any downstream bridge or lighting control zone via CAT-5 cabling. In one embodiment of the invention, a gateway can support up to 32 devices without a bridge. Overall, an embodiment of a gateway can support up to 400 downstream devices connected to it.

There are two methods of powering a gateway. A gateway may be powered over a CAT-5 connection to one of connector ports 2056a-c from either a power supply, power pack, or transceiver/power supply of the invention. While it is preferred that the power supply, power pack, or transceiver/power supply be connected directly to one of the RJ-45 connector ports, these devices may be located elsewhere in the network. A gateway may also be powered with a power supply of the invention over Class 2 wiring connected to power terminal connector 2096 on back panel 2021B of the gateway. In one embodiment of the invention, the gateway consumes about 80 mA.

A gateway functions as an autonomous scheduler using an internal real-time clock. A gateway stores information called "lighting control profiles," which include settings that will be applied at a particular time or date to a group of devices connected to the gateway. All lighting control profiles are created in the lighting control software (described in more detail below) and are stored within the gateway. Once programmed with one or more profiles, a gateway can operate independently of the lighting control software. Using its onboard time clock, a gateway sends out the settings specified in the profiles to the appropriate downstream devices according to a defined schedule. Lighting control profiles can also be selected and run on-demand from a gateway.

Figure 21:
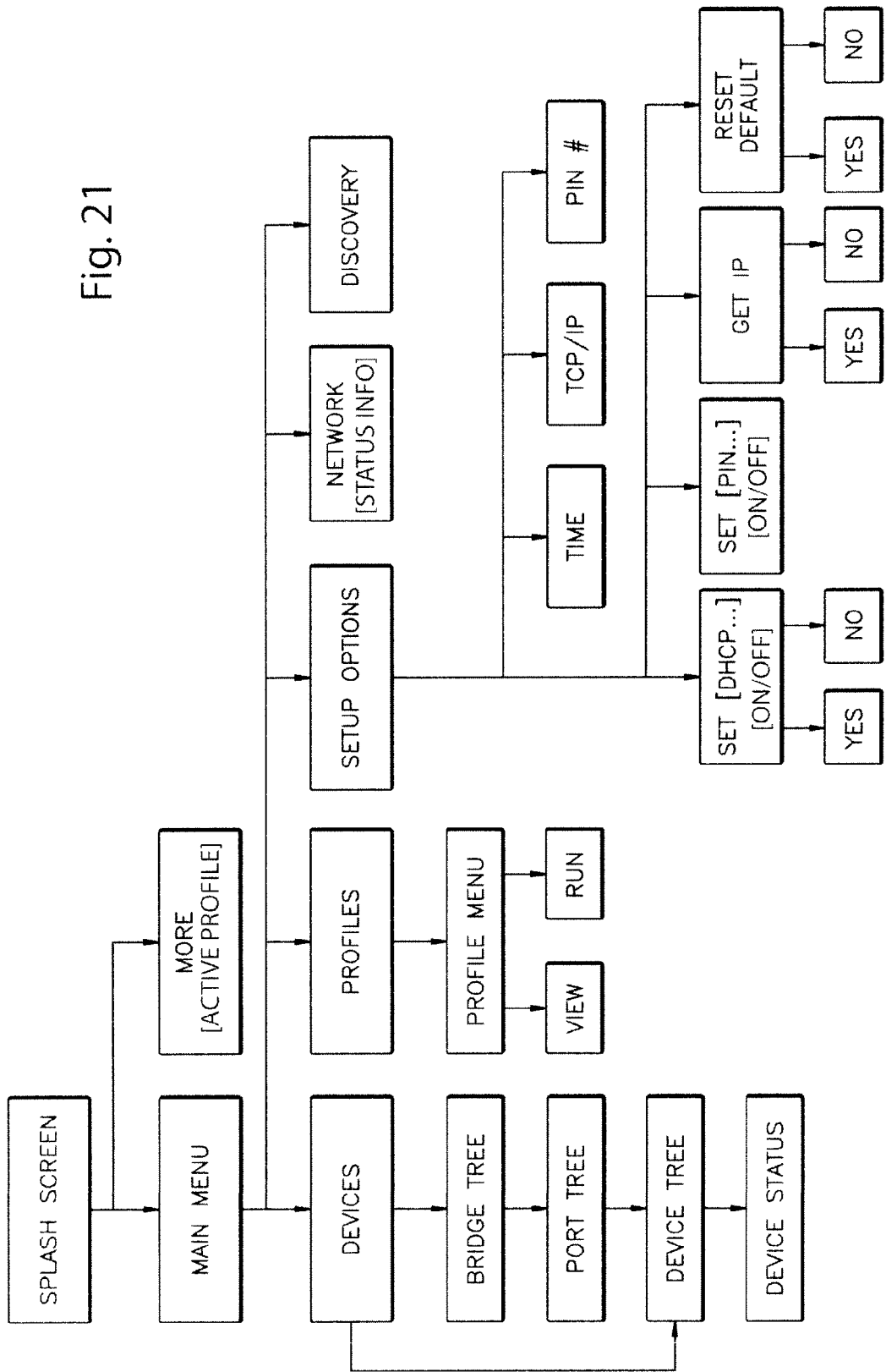
FIG. 21 illustrates an exemplary embodiment of a menu interface of a gateway according to the invention.

A gateway also provides a local user interface for accessing any of the downstream devices connected to it. Using display screen 2023 and finger-touch controls 2025, users can navigate a gateway's menu-driven interface to view status and configuration information about any downstream device. FIG. 21 shows an embodiment of a gateway menu interface accessible via the display screen and finger-touch controls. Access to the system via a gateway preferably requires a 4-digit pin code, and device inventory and status information can be displayed at a gateway.

Figure 22:
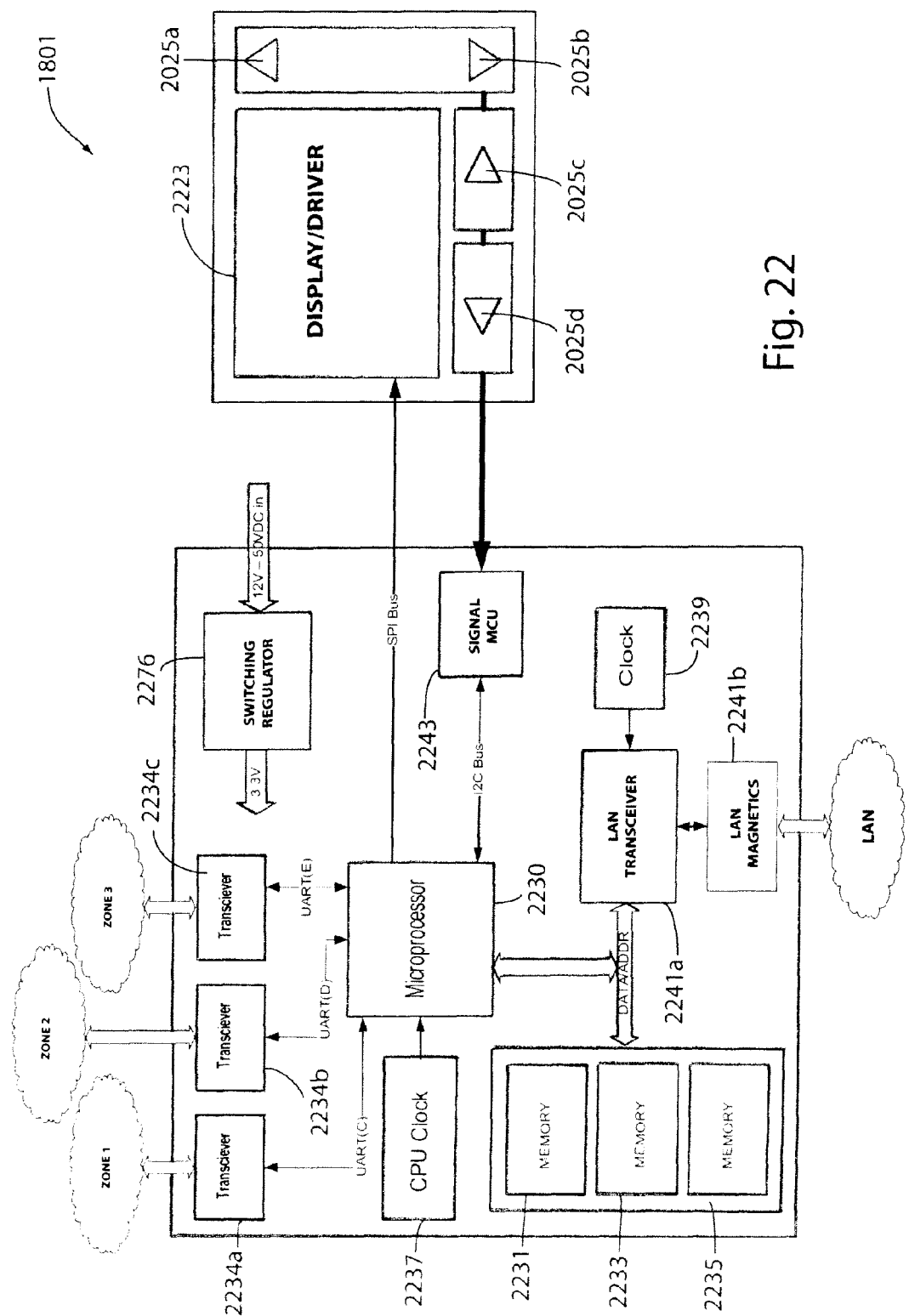
FIG. 22 is a block diagram of an exemplary embodiment of a gateway according to the invention.

FIG. 22 shows a hardware embodiment of a gateway in accordance with the invention. Gateway 1801 includes a microprocessor 2230, a memory board containing memory devices 2231, 2233, and 2235, CPU clock 2237, LAN clock 2239, LAN transceiver 2241A,B, three transceivers 2234a-c, switching voltage regulator 2276, display/driver 2223, and signal microcontroller 2243.

Microprocessor 2230 is preferably an 8-bit Rabbit 3000 microprocessor from Rabbit Semiconductor. In one embodiment of the invention, the microprocessor configuration is implemented using Rabbit's RCM3305 core module reference design. Microprocessor 2230 preferably has 44 MHz clock speed; hardware and/or software support for TCP/IP, IrDA, SDLC/HDLC, Async, SPI, and I2C; 56+ digital I/O; 6 serial ports; and operates at 1.8-3.6 volts (5 volt tolerant I/O). Microprocessor 2230 communicates with external memory devices 2231, 2233, and 2235 via a parallel data/address bus. This interface is also used to communicate with internal registers and buffers of LAN transceiver 2241A,B. The application code executed by one embodiment of the microprocessor implements Rabbit's embedded TCP/IP stack software. This software comprises API calls and hardware drivers to implement most TCP/IP protocols, such as, for example, TCP, UDP, HTTP, etc. This allows the gateway to interface with an IP network and communicate with the lighting control software using standard protocols over a preferably 10/100 Ethernet network. Microprocessor 2230 executes application code from the memory devices and controls all communication peripherals.

Memory device 2231 is preferably a 512 KB flash memory, which is a type of nonvolatile memory. Memory 2231 is divided into two blocks, 300 KB for program memory, where the actual application code and gateway configuration block parameters are stored, and 210 KB for lighting control profile data storage. The gateway configuration block is an area reserved for configuration parameters such as gateway serial number, Ethernet MAC address, etc. This area is initialized during manufacture. Memory 2231 may be a Silicon Storage Technology SST39VF040.

Memory device 2233 is preferably a 512 KB FSRAM (fast static random access memory). This memory is used by the application code and stack software for variables and communication buffers. The Rabbit TCP/IP Stack software allocates variables in this memory to manage and store information received from the LAN transceiver and other communication peripherals. Memory 2233 may be an Alliance Semiconductor AS7C34096.

Memory device 2235 is preferably a 512 KB SRAM (static random access memory). The application code allocates space in this memory for lighting control profile schedules and settings tables. Profile data information is retrieved from memory 2231 and loaded into structures defined in this memory area for fast execution. This memory area is also used for structures that contain all device information discovered during self-commissioning (described below). Memory 2235 may be an Integrated Silicon Solutions, Inc. IS62WV5128.

CPU clock 2237 includes a main CPU oscillator (22.12 MHz) and a real-time clock oscillator (32.768 KHz). The CPU clock is multiplied internally for an operational frequency of 44 MHz, and the real-time clock circuitry is external to the processor and provides an initial clock for serial programming as well as the reference to an internal clock for calendar and profile scheduling. LAN clock 2239 is preferably an Ethernet driver oscillator (25 MHz). These clocks are all individual circuits that provide each module with their respective operational frequency.

LAN transceiver 2241A,B is preferably a 10/100 Ethernet MAC/PHY (media access control/physical layer) driver and associated magnetics, respectively. This device allows microprocessor 2230 to communicate over the LAN using a standard IEEE 802.3 Ethernet protocol. The microprocessor TCP/IP stack software implements the higher level protocols for TCP/IP communication. The lighting control software communicates to the gateway using UDP, TCP, HTTP protocols. LAN transceiver 2241A is preferably an AX88796LF local bus fast Ethernet controller by ASIX Electronics Corporation, and LAN transceiver 2241B is a high speed LAN magnetics isolation module, which may be a TG1100-S050N2 by HALO Electronics, Inc.

Transceivers 2234a-c are preferably EIA 485 transceivers coupled respectively to connector ports 2056a-c. Using three UARTs from microprocessor 2230, the gateway can interface with the lighting control zones and devices connected to the three connector ports. Each connector port connection preferably operates in half-duplex, 2-wire mode at 115.2 Kbps. Microprocessor 2230 controls these ports and the read/write data packets used to communicate with connected devices.

Switching regulator 2276 is a DC/DC step-down switching regulator, which may be a Linear Technology LT1776. In one embodiment, this circuit converts a DC input voltage of 12V-50V to about 3.3V output with 500 mA current. All the electronic components in gateway 1801 are powered via this regulator.

Display/driver 2223 is an LCD (liquid crystal display) driver display that may be implemented using Desintron F-STN positive display DV5520BB (132 W×64H pixels). Microprocessor 2230 communicates with the display driver, which in one embodiment is integrated with the glass screen of the LCD, by sending data and commands using an SPI serial communication interface. This display/driver provides a user interface that displays a number of menus and options (see FIG. 21) that show information and status of the devices connected to the gateway, as well as the current status of the Ethernet and gateway configuration parameters.

Gateways implement finger-touch controls of the invention as described above with respect to the wall units. Display/driver 2223 includes a flexboard circuit laid out in a special pattern to recognize four finger-touch controls: up 2025a, down 2025b, right (enter) 2025c, and left (escape) 2025d. Signal microcontroller 2243 has specialized hardware and software that measures capacitance from an array of sensors in the flexboard circuit, and is preferably a Programmable System on a Chip (PSoC) from Cypress Semiconductor. When a user touches one of the finger-touch controls 2025a-d, the difference in capacitance is measured by microcontroller 2243 and filtered from any noise. Microprocessor 2230 polls microcontroller 2243 through the I2C communication bus, checks for any key presses, and then performs and displays the respective action on display screen 2023.

In accordance with the invention, the most powerful way of controlling the lighting control system is through the Web-based lighting control software. The control software provides complete system administration via a tabbed graphical interface. The control software features a network device tree and three primary pages: information, groups, and profiles. The information page provides individual device information, such as, for example, properties, setting, and status information. The group and profile pages provide the ability to create lighting control profiles, apply them to particular lighting zones, and schedule their implementation. The control software requires a single installation onto a host computer/server. Multiple users can access the software via a standard Web browser with network access to the host computer. Each user can be required to login to the system with a user name and password and can be assigned varying degrees of system access. Communication between the gateways and the control software is preferably encrypted.

In one embodiment of the invention, the host computer preferably has a 133 MHz-1.2 GHz processor, 128-512 MB RAM, and 2-30 GB hard drive. The Web browser is either Internet Explorer 7.0 by Microsoft Corporation of Redmond, Wash., or preferably Mozilla Firefox® 2.0.0.6 by Mozilla Corporation of Mountain View, Calif. The operating system is either Microsoft's Windows® Server 2000 or preferably Windows Server 2003, and the software requirements are Microsoft's IIS (Internet Information Services) 5.0 or 6.0, NET 2.0 or higher (the Microsoft .NET Framework is a software component that is part of the Microsoft Windows operating system).

Figure 23:
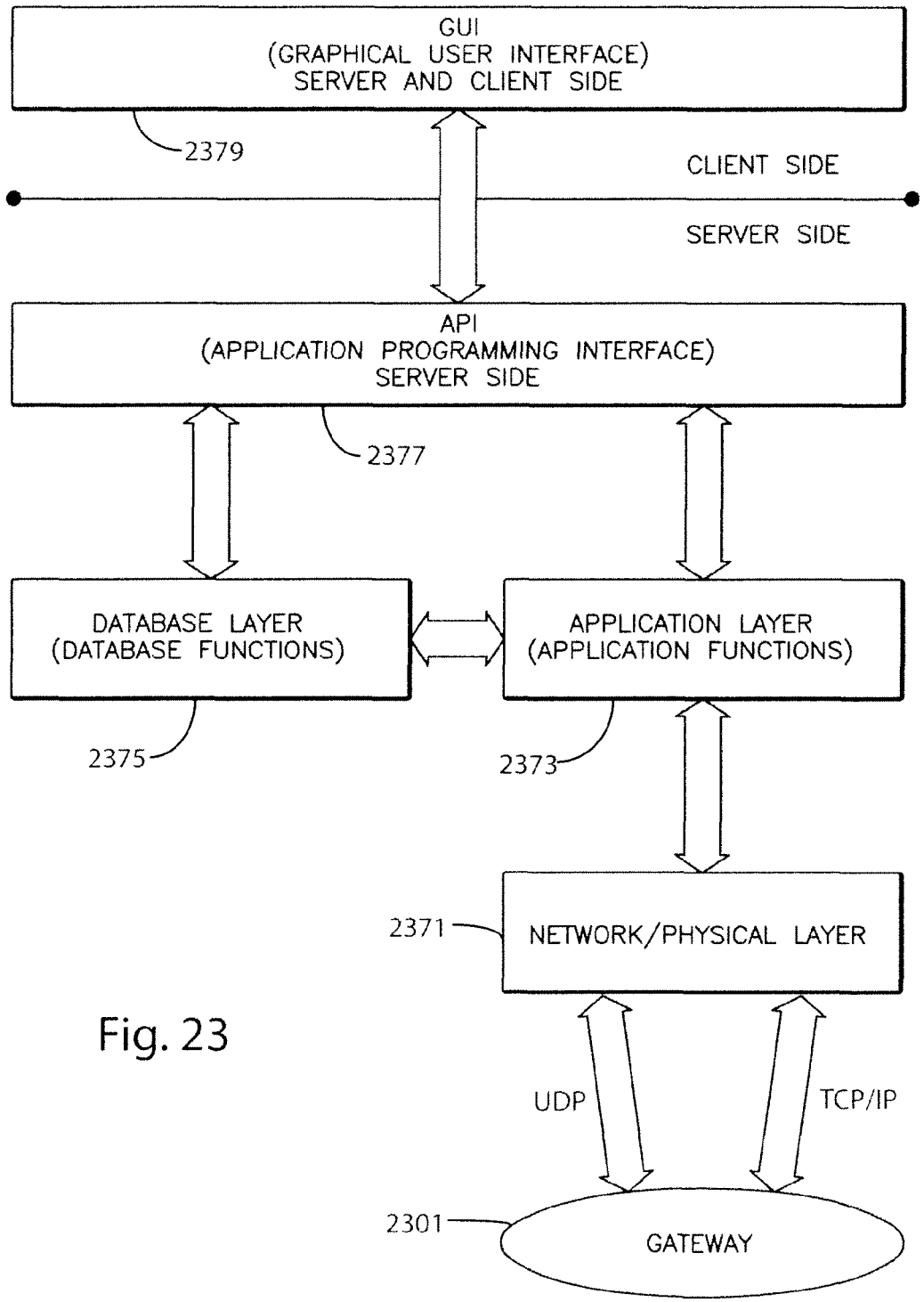
FIG. 23 is a high level block diagram of an exemplary embodiment of the lighting control software according to the invention.
Figure 24A:
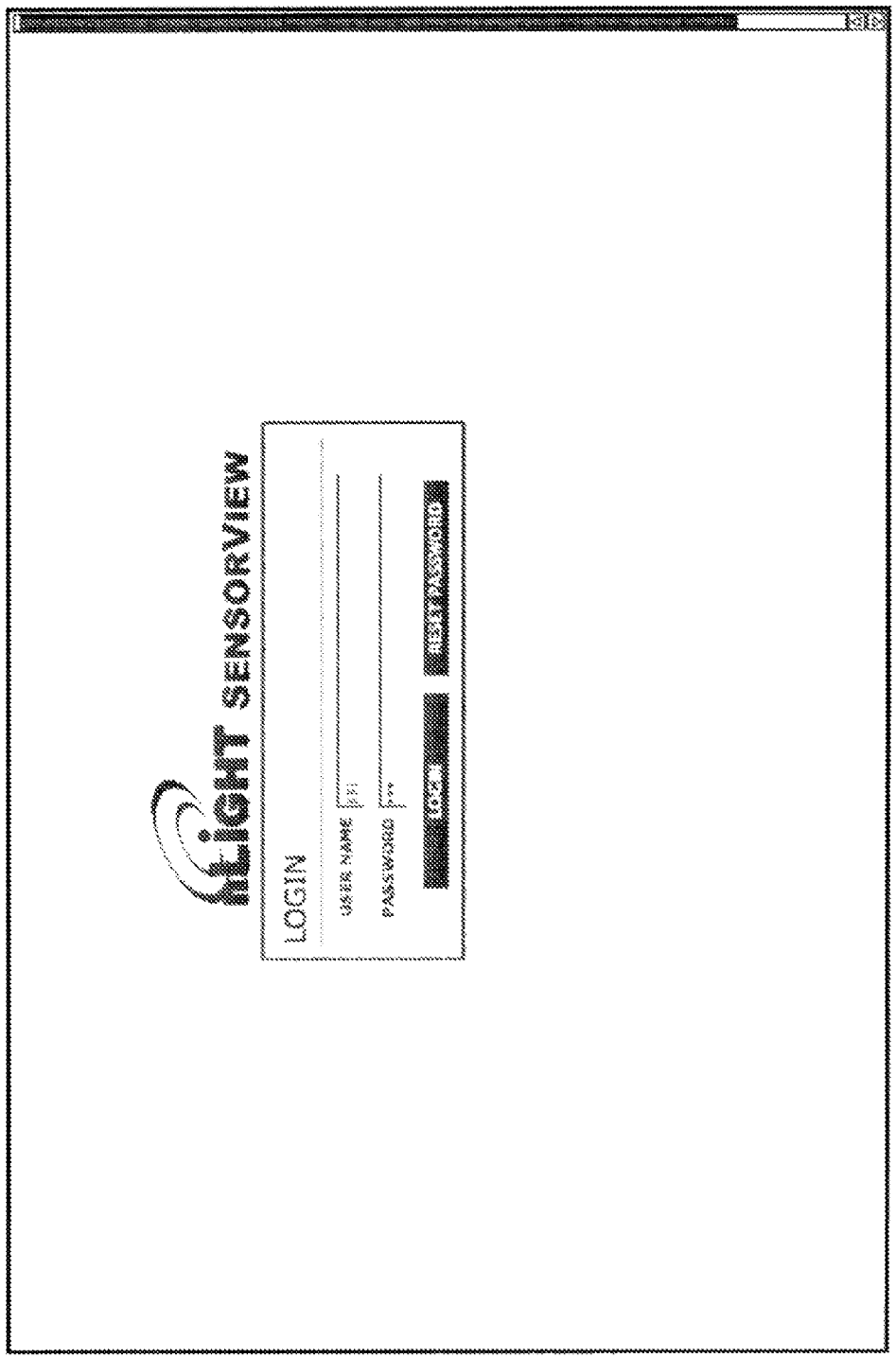
FIGS. 24A-K illustrate an exemplary embodiment of various screen displays of the lighting control software according to the invention.
Figure 24B:
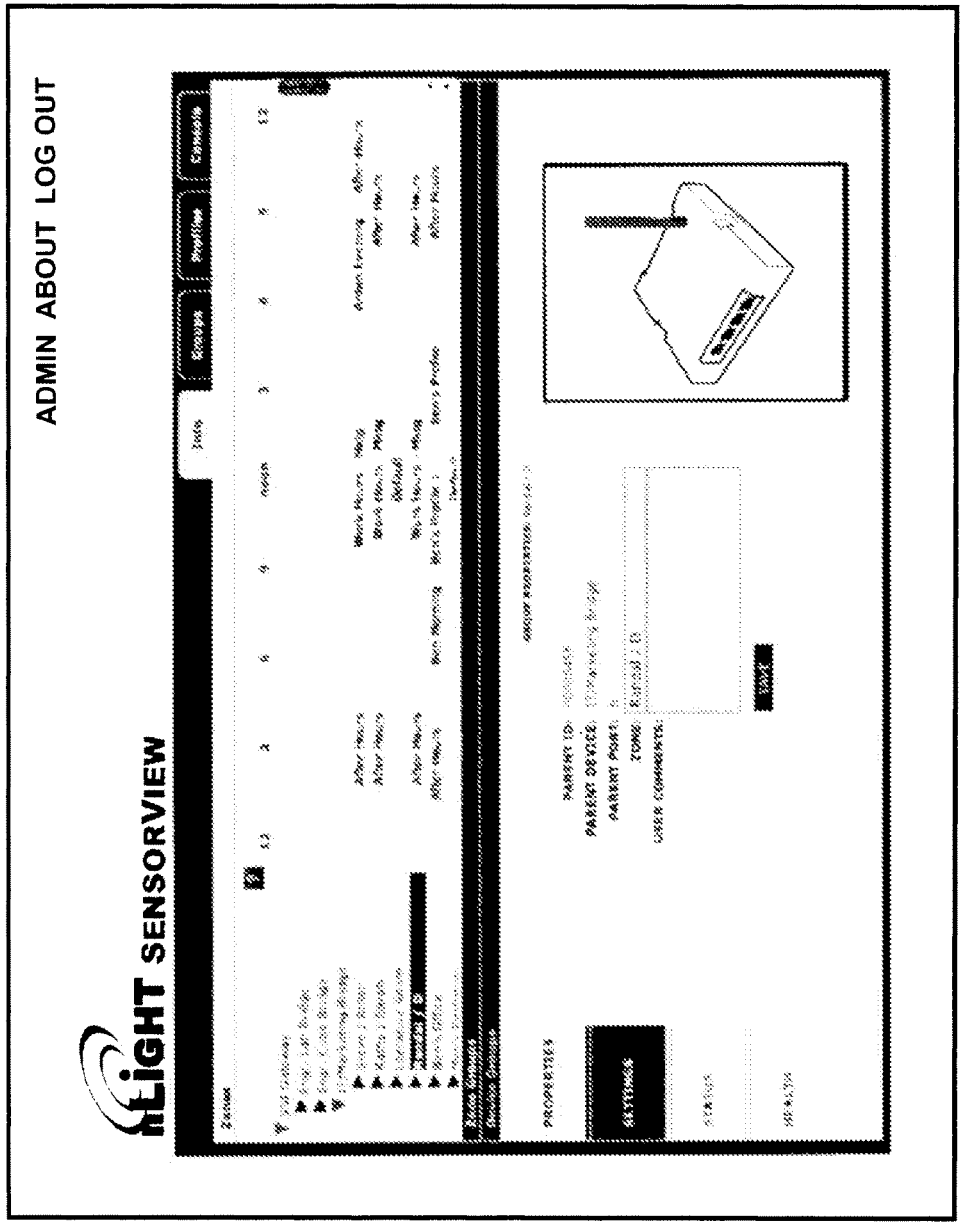
Figure 24C:
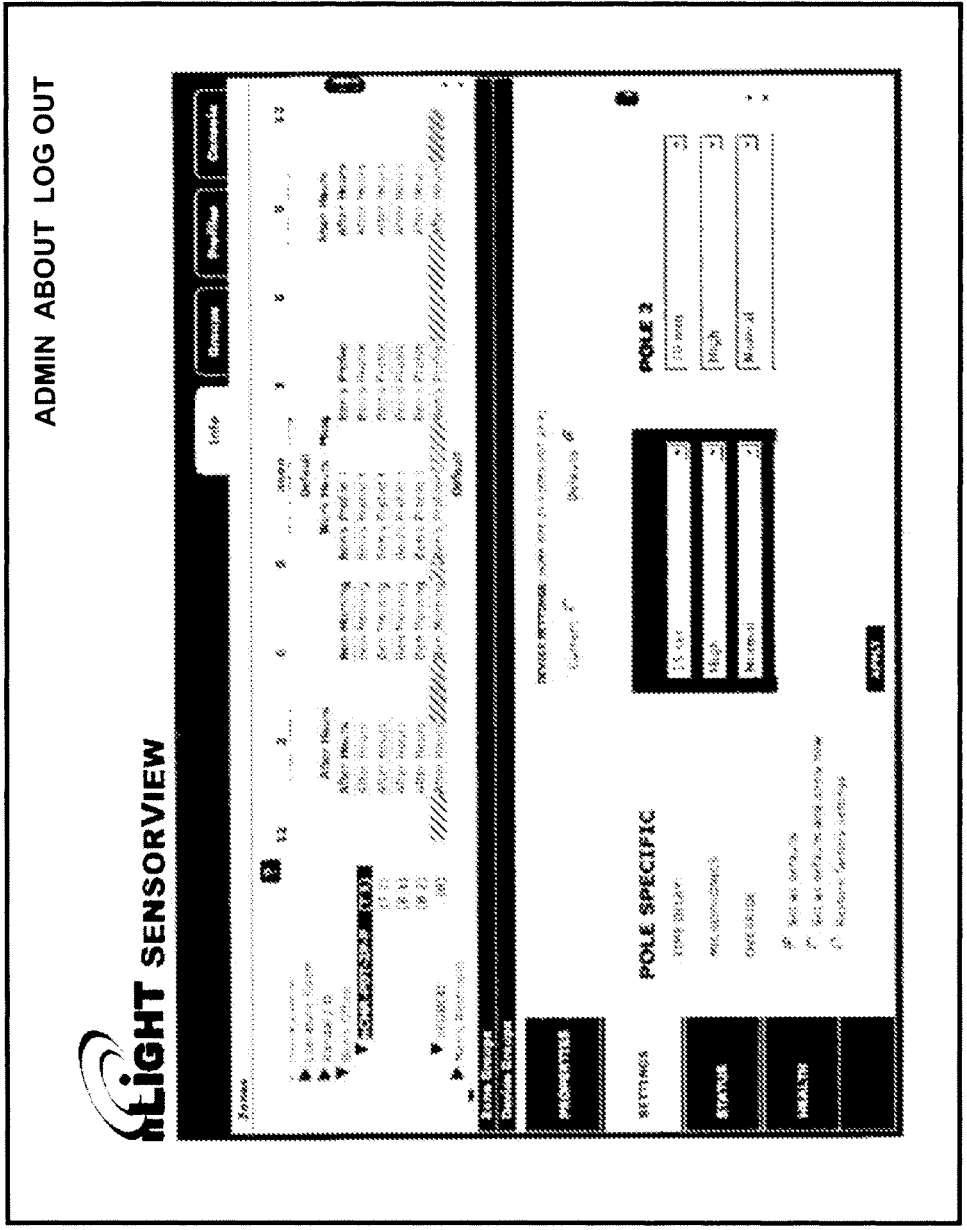
Figure 24D:
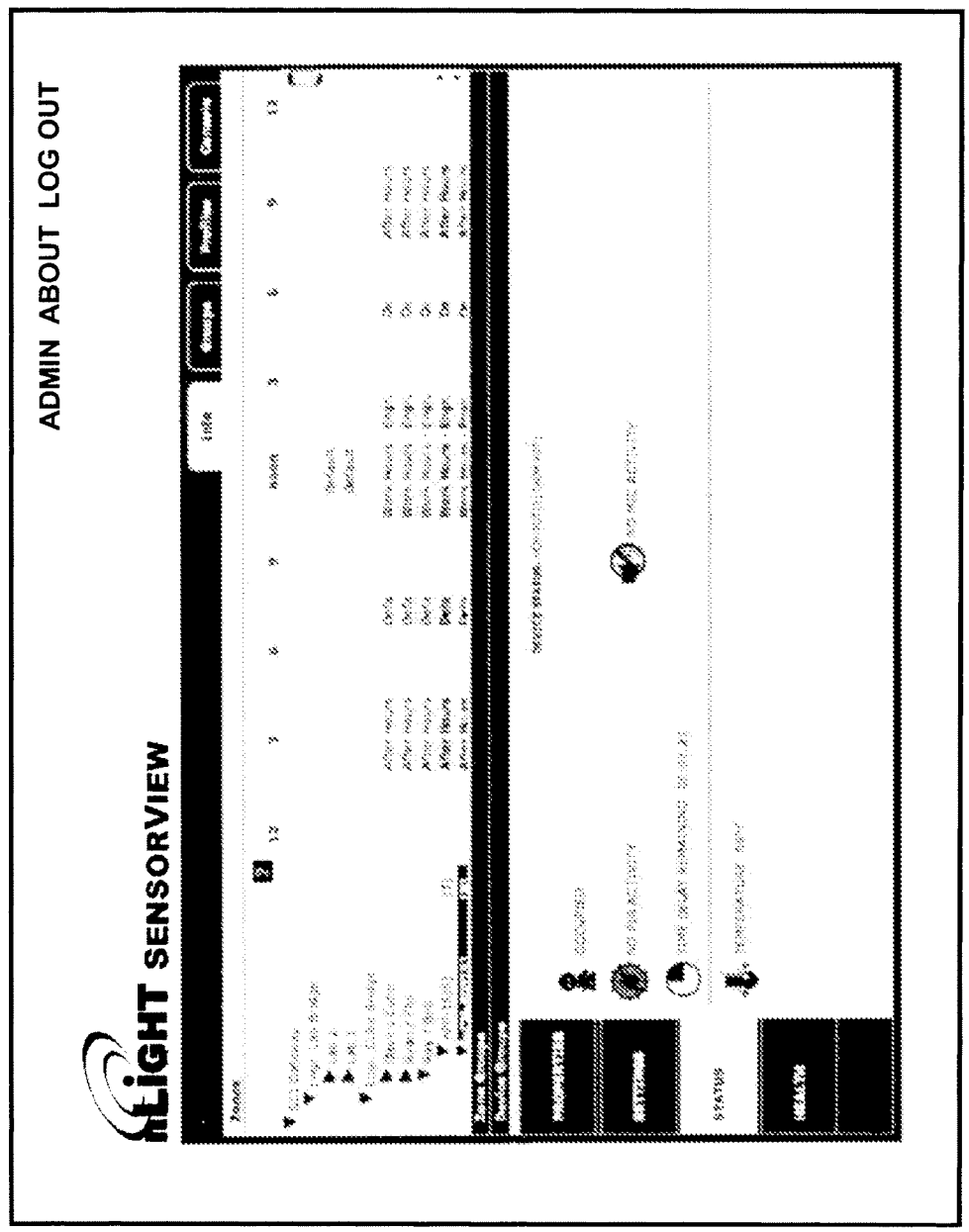
Figure 24E:
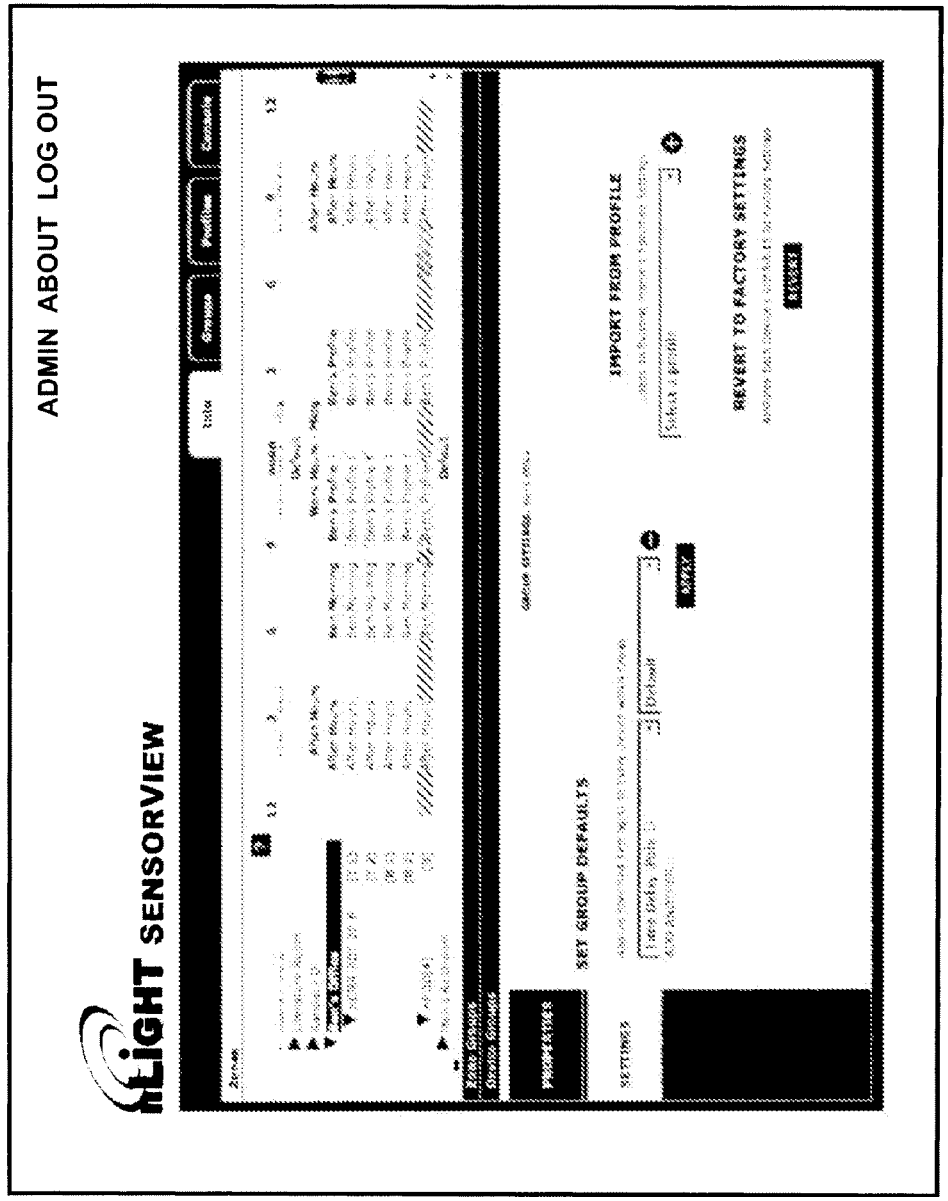
Figure 24F:
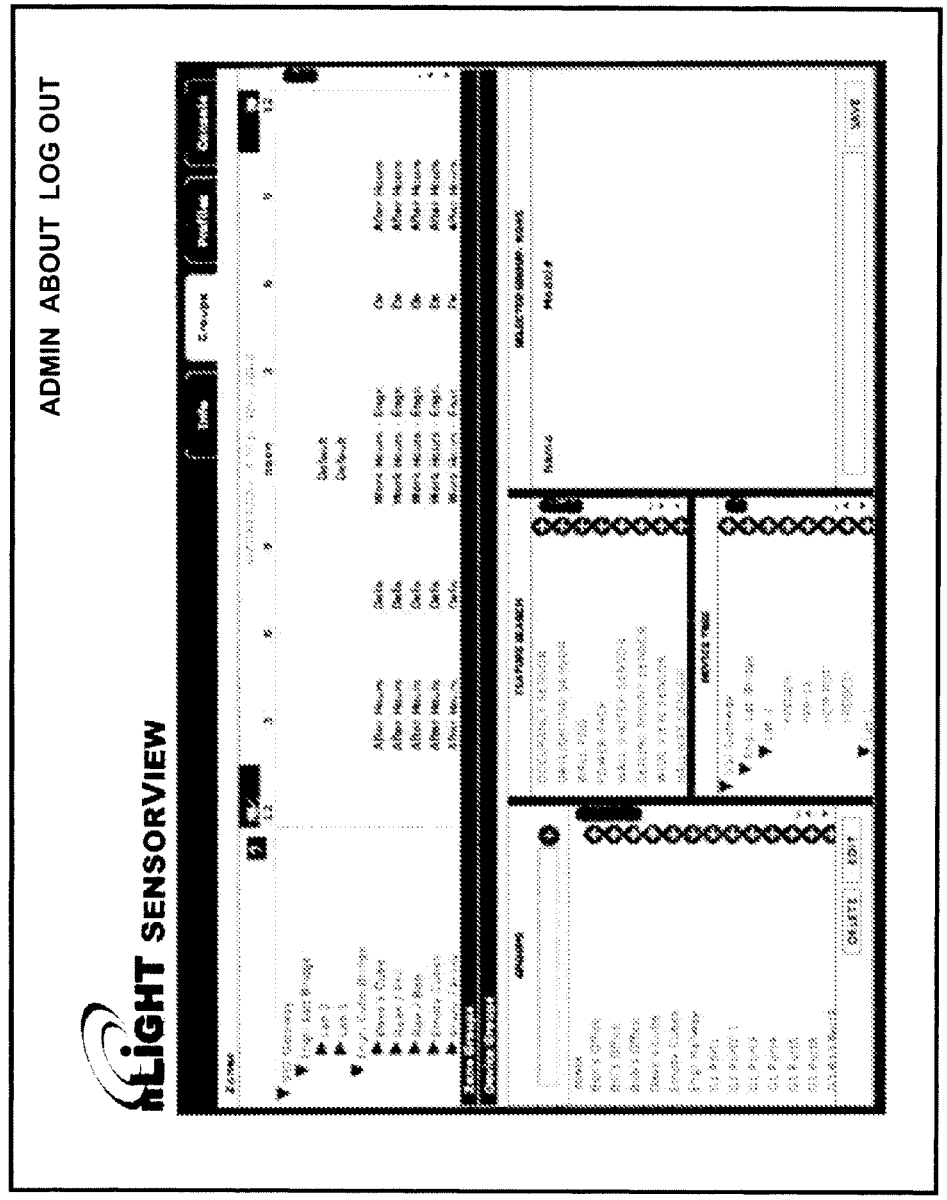
Figure 24G:
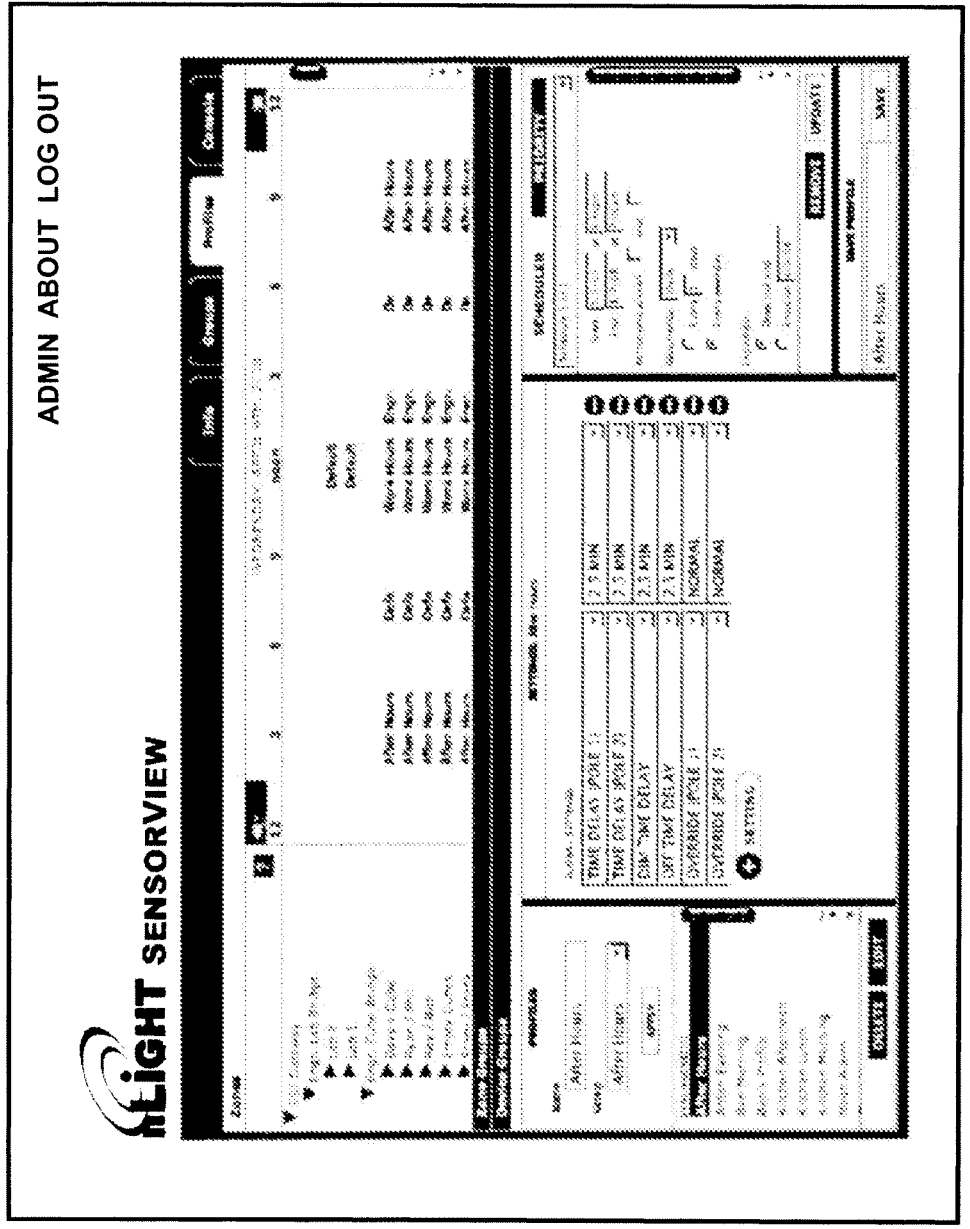
Figure 24H:
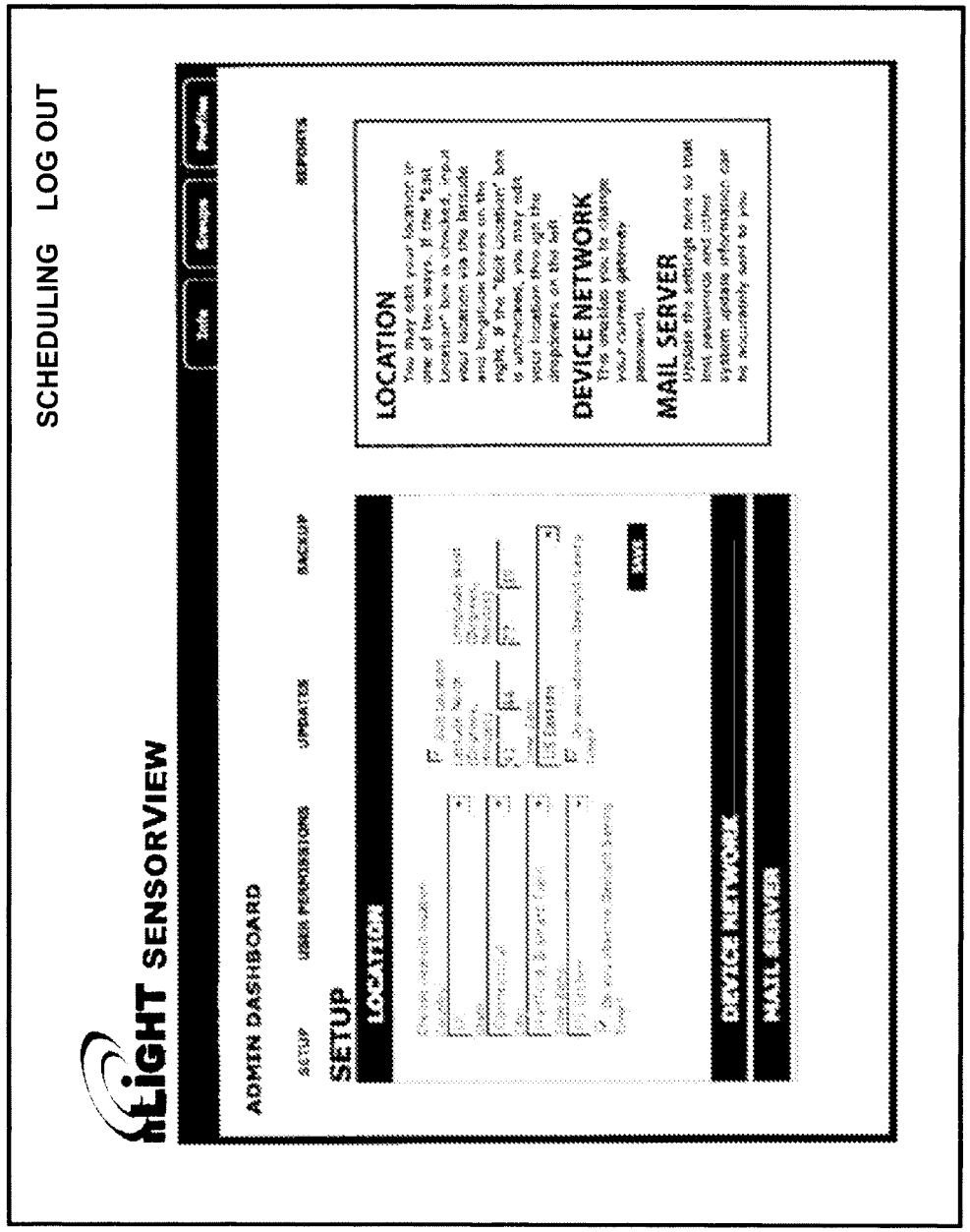
Figure 24I:
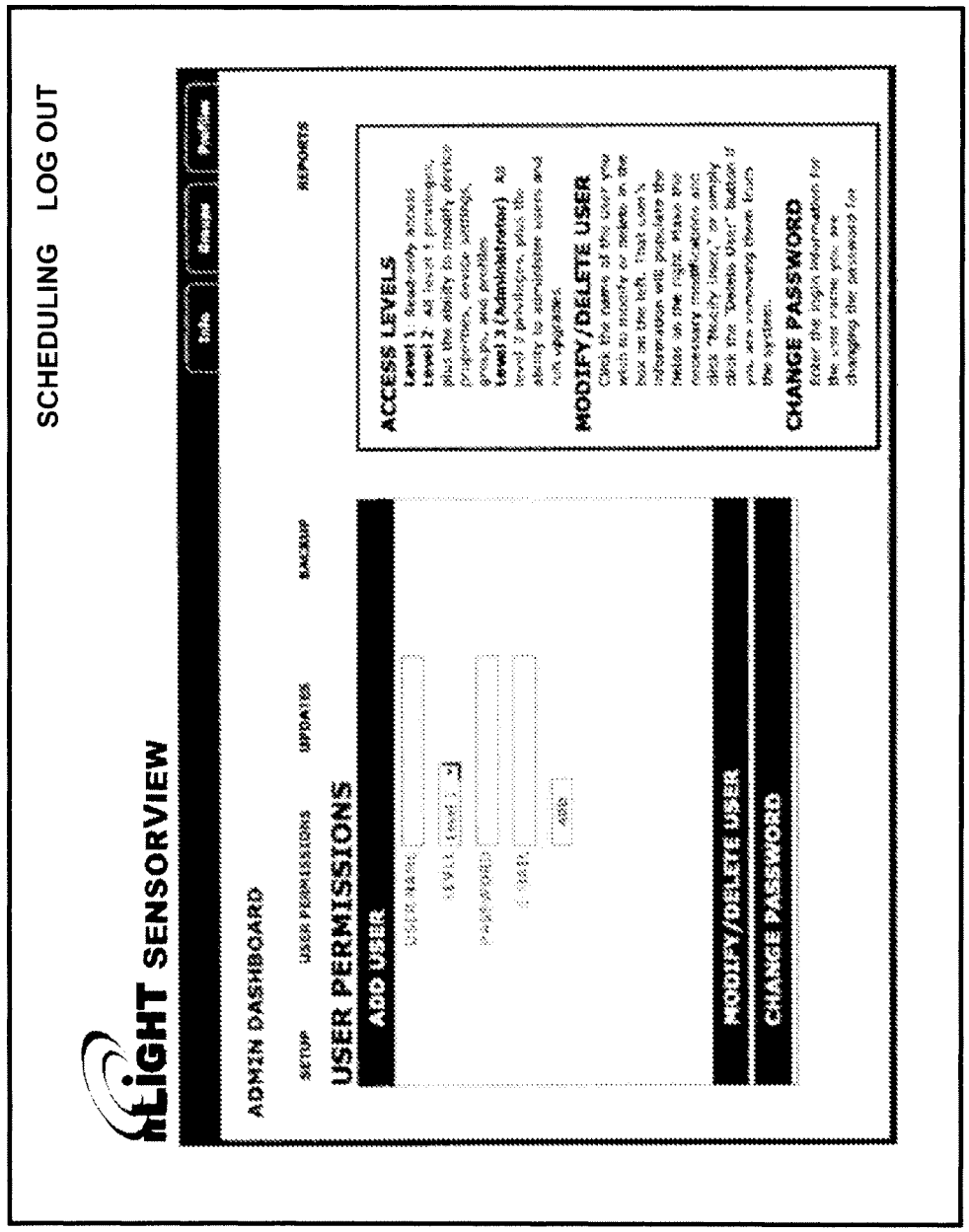
Figure 24J:
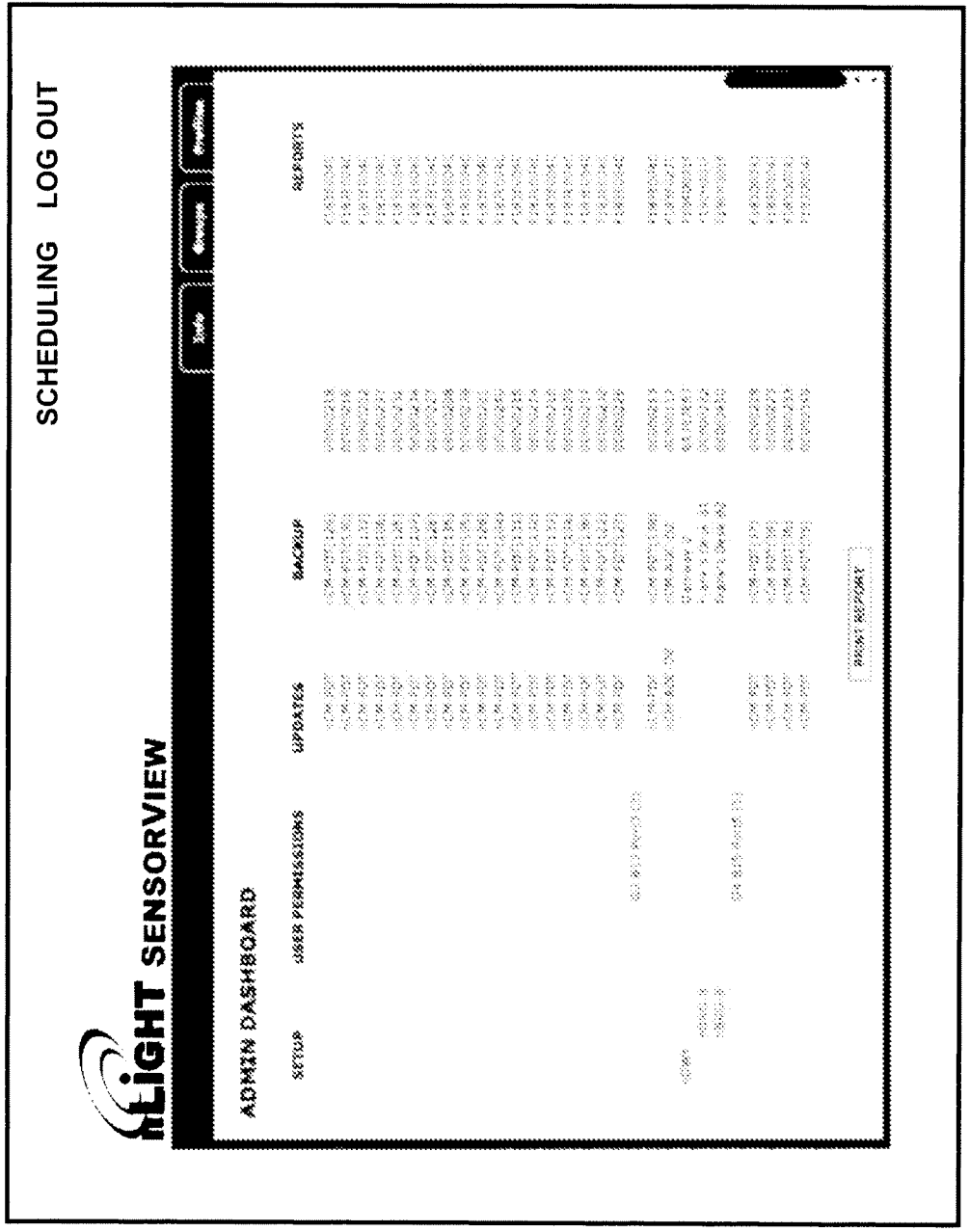
Figure 24K:
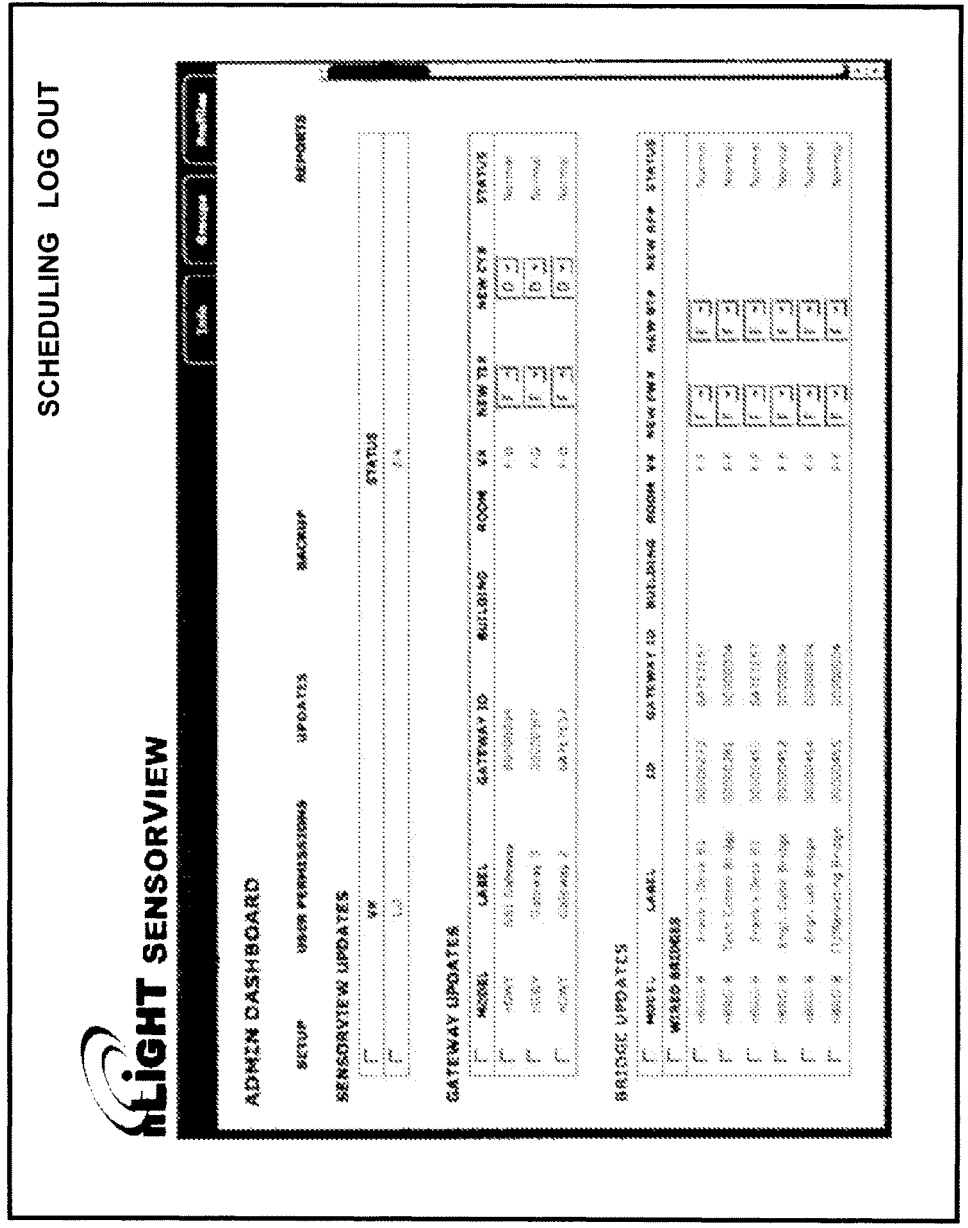

FIG. 23 illustrates the structure of the lighting control software in accordance with the invention. Network/physical layer 2371 communicates with a gateway 2301 via UDP messages or TCP messages. When information needs to be sent to or retrieved from a device, a message is sent to the gateway, which in turn forwards the message to the device and returns the response back to this layer. Application layer 2373 is a group of functions that handles data manipulation to and from the API (application programming interface) functions, to and from the network/physical layer, and to and from the database. These functions handle tasks such as storing and retrieving group information, storing and retrieving profile and schedule information, and forming requests for information from a gateway or device. This layer also contains functions for upgrading devices, gateways, and the lighting control software itself. Database layer 2375 is a suite of functions specifically designed to write and read data to and from database tables. Formatting of data for storage in the database is also handled here. API layer 2377 contains functions called by user graphical interface layer 2379. These functions retrieve information from the layers below and pass that information up to user interface layer 2379 for display to the user. The information is formatted appropriately as required by user interface 2379.

FIGS. 24A-K show various screen displays of the lighting control software in accordance with the invention. The information page displays a device's current settings and operational status and allows modifications of those settings. The information page is divided into three tabs that provide individual device properties, settings, and status information, respectively. The properties tab of the information page presents device identification information and allows custom naming by a user. The information presented may include model number of the device, a device identification number, a short description, a date code, and space for user comments. The settings tab of the information page displays the settings of, for example, a particular 2-pole sensor device. The display may show settings for each pole including, for example, sensor time delay, sensitivity level of sound detection sensing, and enablement/disablement of override, broadcast channel, source channel, and tracking settings. The status tab of the information page displays status information about a particular device. The status is continuously updated and may indicate whether occupancy is detected, whether passive-infrared sensing is enabled, and/or whether sound detection is enabled. The displayed status may also indicate photocell behavior, remaining sensor time delay, current dimming level, device temperature, photocell transition time, photocell light reading, and relay position (i.e., whether open or closed).

The lighting control software provides for the creation of lighting control profiles. Lighting control profiles are outlines of settings that direct how a collection of devices function for a defined time period. Profiles have three main components: groups, settings, and schedules. A group is a collection of devices defined by the user that may include some or all devices from the same zone or different zones to which a lighting control profile is applied. The control software provides the ability to identify devices according to convenient categories and features such as, for example, function (e.g., occupancy sensing, daylight sensing, and/or dimming), device type (e.g., power pack, wall unit, or sensor), power type (e.g., low voltage or line voltage), detection technology (e.g., passive infrared or dual passive infrared and sound), type of relay, and/or photocell feature. The settings define parameters that direct how a group of devices will function. The settings may be grouped into general, occupancy, daylight, or advanced category tabs. Some device settings are numerical parameters (e.g., delay time), while others are enable/disable only. The lighting control screen provides a group screen for creating a profile schedule. A profile schedule includes calendar dates, times, and recurrence periods (e.g., daily, weekdays, weekends, weekly, monthly, and yearly). Offsets to account for sunrise and sunsets may also be programmed, as well as adjustments for daylight savings time.

Lighting control profiles are saved in a database of the host computer. In addition, each gateway maintains a copy of all profiles applicable to its downstream devices. Advantageously, the gateways, and not the host computer/control software, administer the profiles. This feature allows the lighting control system to operate without constant connection to the host computer. A real-time clock within each gateway directs when a particular profile is sent out over the network backbone. Once on the backbone, the bridges route the profiles to the intended devices. When a particular profile's schedule expires, the gateway will then send out either the profile with the next highest priority setting or the device's default settings. Because lighting control profiles are stored in gateways, a user can access and run them on demand at the gateway. When accessed via the gateway's touch controls, the profile's normal associated schedule is ignored and the settings entered or selected by the user are sent immediately downstream to the applicable devices. Profiles can also be run on demand from the host computer or a remotely accessed computer or handheld device via the control software.

Figure 25:
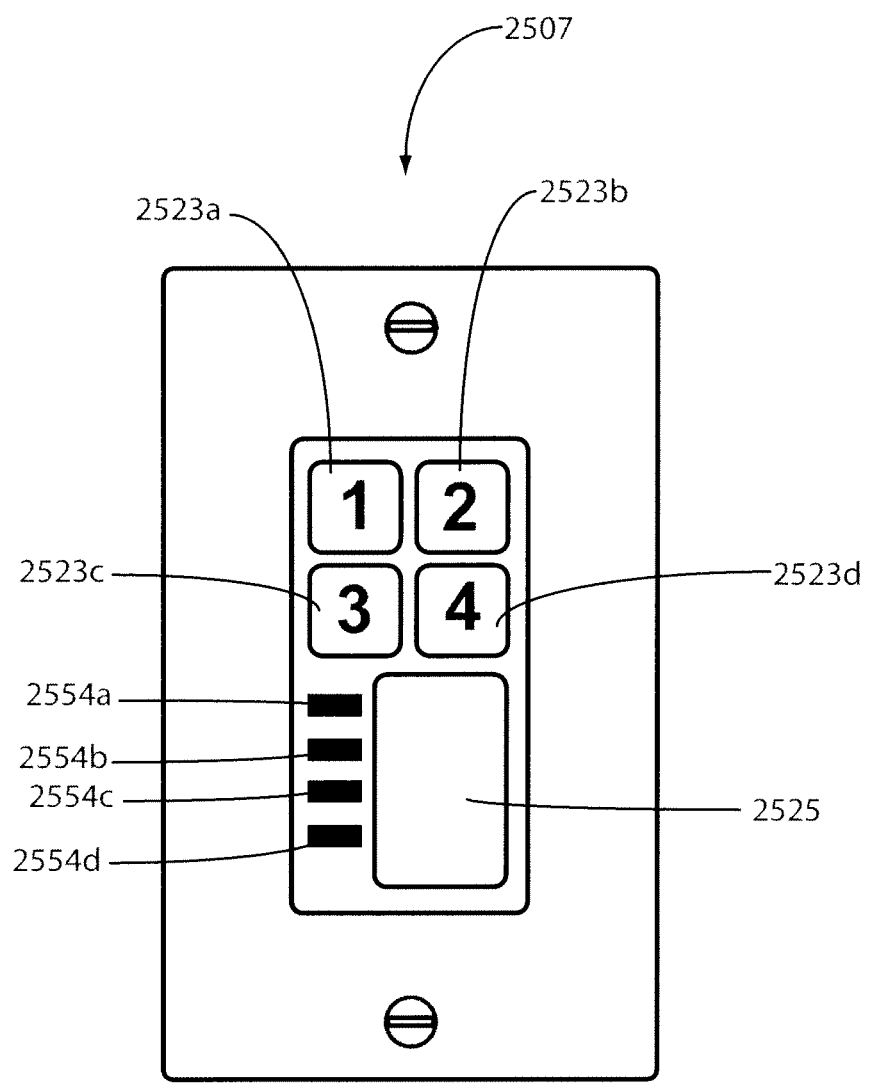
FIG. 25 illustrates an exemplary embodiment of a scene controller wall unit according to the invention.

Another way of running profiles on demand is with a scene controller wall unit of the invention. A scene controller wall unit is located in a lighting control zone and provides a user with local access for selecting one of four user-created lighting profiles that can be applied to that lighting control zone. FIG. 25 shows scene controller wall unit 2507, which may be advantageously installed in zones where, for example, up to four different levels of on demand dimming are required. This single gang device has four finger-touch controls 2523a-d (no mechanical push-buttons) to which any four of the zone's lighting control profiles can be assigned using the lighting control software. Scene controller wall unit 2507 also has two preferably RJ-45 connector ports and four LEDs 2554a-d to indicate which one of the profiles is currently selected. Each LED is preferably located next to the profile's name in area 2525 to indicate the selected profile. Scene controller wall unit 2507, like other wall units, connects to other devices in the zone via daisy-chain wired CAT-5 cabling connected to its connector ports. Scene controller wall unit 2507 has the ability to communicate over the network backbone and requires connection to a bridge in order to function.

An unlimited number of potential lighting control profiles are possible when all the combinations of groups, settings, and schedules are considered. To organize this collection, the lighting control software provides several profile management features. First, profiles can be easily created, edited, deleted, or deactivated. Second, in order to resolve conflicts between overlapping profiles with different settings, a configurable priority list is provided to the user. Finally, a convenient 24-hour bar chart is displayable to show the resultant profiles scheduled for each lighting control zone. When fully expanded, this chart also shows the tracking and/or broadcast lighting control states for each device within a zone. A tracking state is the resultant type(s) of lighting control information that a relay or dimming output will respond to when all applicable profiles and settings have been considered. Tracking states include occupancy; photocell; switch; occupancy and photocell; occupancy and switch; occupancy, photocell, and switch; photocell and switch; override on; and override off. A broadcasting state is a listing of the lighting control information that is output from a sensor or a switch when all applicable profiles and their priorities have been considered. Broadcast states include occupancy; photocell; switch; occupancy and photocell; occupancy and switch; occupancy, photocell, and switch; and photocell and switch.

Figure 26:
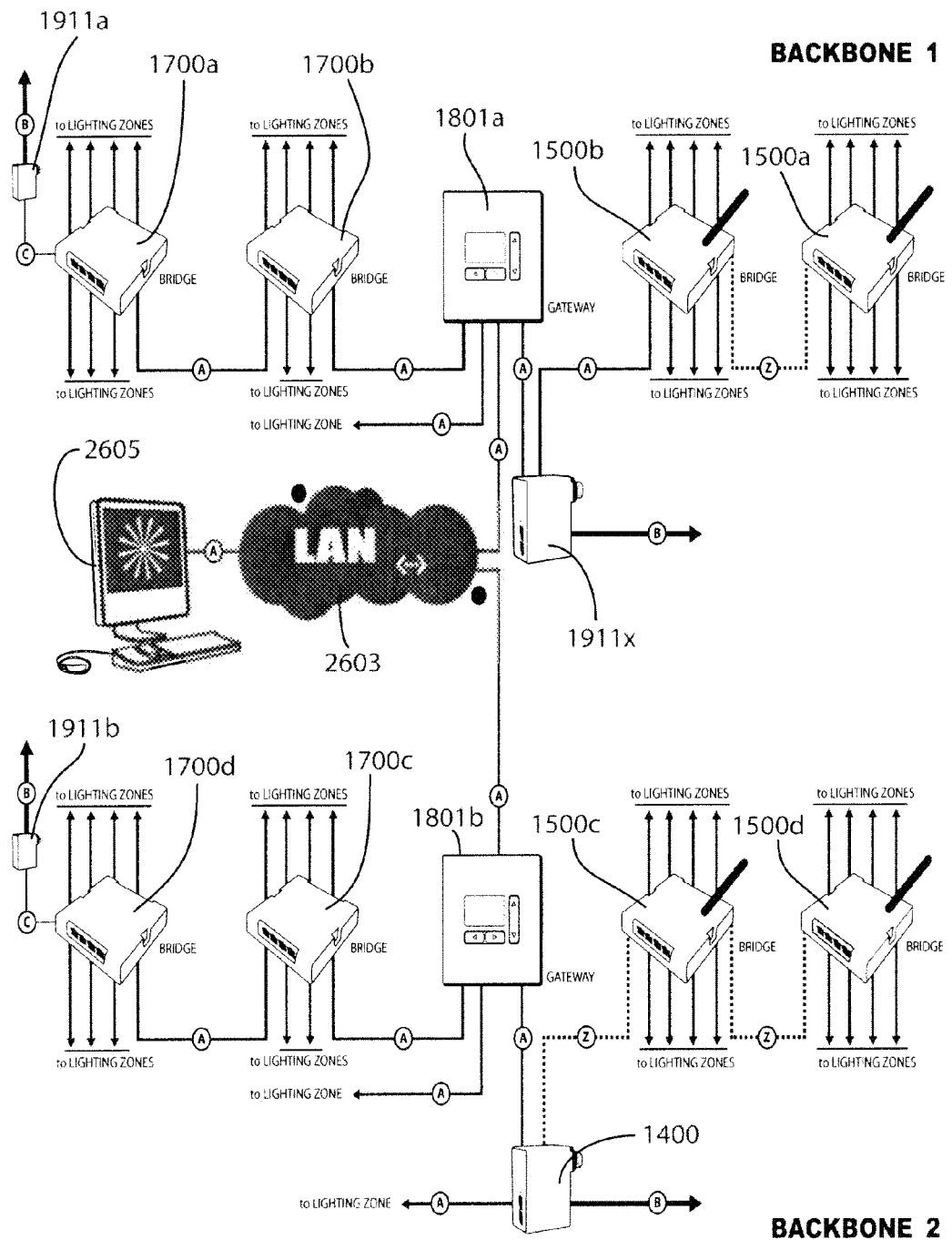
FIG. 26 illustrates an exemplary embodiment of a lighting control system according to the invention.

FIG. 26 illustrates a representative embodiment of a lighting control system in accordance with the invention. System 2600 includes two network backbones. Backbone 1 includes bridge 1500a, which is wired via CAT-5 cabling to eight lighting control zones. Bridge 1500a also is wirelessly connected to bridge 1500b, which is wired via CAT-5 cabling to seven lighting control zones and power supply 1911X. Power supply 1911X is connected to line voltage via Class 1 wiring B and delivers power and information via CAT-5 cabling to gateway 1801a. The delivered information is from bridges 1500a and b, which receive information from their respective lighting control zones. Power supply 1911X also delivers power and information via CAT-5 cabling to bridge 1500b, which in turn distributes remaining power and delivers information to its lighting control zones and to bridge 1500a, which also distributes remaining power and delivers information to its lighting control zones. The delivered information is from gateway 1801a. On the other side of gateway 1801a, power supply 1911a is connected to line voltage via Class 1 wiring B and delivers power to bridge 1700a via low voltage Class 2 wiring C. Bridge 1700a is wired via CAT-5 cabling to seven lighting control zones and to bridge 1700b. Bridge 1700b is in turn wired via CAT-5 cabling to six lighting control zones and to gateway 1801a. Remaining power from bridge 1700a is distributed to bridge 1700b and the lighting control zones of both bridges. Any remaining power is delivered to gateway 1801. Gateway 1801a is further wired via CAT-5 cabling directly to another lighting control zone and to LAN 2603, which is preferably an Ethernet LAN. Host computer 2605, which executes the lighting control software of the invention, is connected to LAN 2603.

Network backbone 2 of system 2600 includes gateway 1801b, which is also wired via CAT-5 cabling to LAN 2603. Gateway 1801b is further wired directly to a lighting control zone and to bridge 1700c via CAT-5 cabling. Bridge 1700c is wired to six lighting control zones and to bridge 1700d via CAT-5 cabling. Bridge 1700d is in turn wired to seven lighting control zones via CAT-5 cabling and to power supply 1911b via low voltage Class 2 wiring C. Power supply 1911b delivers power to bridge 1700d, which distributes remaining power to its lighting control zones, bridge 1700c, bridge 1700c's lighting control zones and, if any power remains, to gateway 1801b. Gateway 1801b is also wired via CAT-5 cabling to transceiver/power supply 1400, which receives line voltage via Class 1 wiring B. Transceiver/power supply 1400 is wired via CAT-5 cabling directly to a lighting control zone, and is wirelessly connected to bridge 1500c. Transceiver/power supply 1400 delivers power and information to, and receives information from, its directly connected lighting control zone and bridge 1500c. That received and delivered information is respectively forwarded to and received from gateway 1801b. Bridge 1500c is in turn wired via CAT-5 cabling to eight lighting control zones and is wirelessly connected to bridge 1500d, which is wired via CAT-5 cabling to eight lighting control zones Each device in system 2600 comes factory preset with default settings. If communication with a gateway is lost, the lighting control zones connected thereto advantageously will continue to run according to their default settings. If a lighting control zone has a power pack or power supply daisy-chain wired within it, communication with the zone's bridge can be lost and the zone will continue to run according to its default settings. Default settings are also implemented when a zone has no scheduled profiles. Users may also customize the default settings via the lighting control software. Because all the devices within system 2600 are networked together, they can be remotely upgraded via the control software in order to incorporate future system features.

Upon initial power up, system 2600 "self-commissions" and automatically begins functioning according to the default settings of its devices. This self-commissioning allows each lighting control zone to be wired and tested separately from the rest of the network. Once the zone is connected to the network backbone (via connection to a bridge or gateway), the zone is automatically classified by the control software as a preset zone. Advantageously, the only information an installer needs to note is the serial number and port number of the bridge that each zone is connected to. Information about the individual devices within a zone is advantageously not required during commissioning, only the location of the zone itself. For example, if 300 sensors are spread across a building and are networked such that they use ten bridges, the installer would only need to write down ten bridge serial numbers and the locations of the zones connected to the bridges' connector. This is far simpler than having to manually commission each device as in known lighting control systems.

As part of the self-commissioning process, the lighting control software advantageously auto-populates a network tree with every device of the invention in the system. By default, the tree is organized according to the physical connectivity between gateways, bridges, bridge ports, and all devices daisy-chain wired in the lighting control zones. Within the tree, each bridge and its ports are labeled with the serial number or port number, respectively. Using this information, a user can then match each lighting control zone to what is displayed in the tree and re-label each zone with a custom name if desired.

For the system to be self-commissioning, each device in the system has an ID that in one embodiment comprises 32 bits. In order to discover all the possible combinations of the 32 bits in a device's ID, an intelligent search method needs to be performed to avoid extremely long discover times. To do this, the "zeroes quiet"/"ones quiet" binary search method is used. This method sends a command that instructs all devices to pulse the line if the specified value (0 or 1) is present in the specified position ($1^{st}$-$32^{nd}$ bit) of their ID's. A path is chosen and devices on the opposing path are instructed to be "quiet" through use of the zeroes and ones quiet commands. This process is repeated until all devices have been discovered.

To implement this in software, the positions of conflicts need to be recorded and returned to later to be evaluated. To accomplish this, the concept of "paths" and "pebbles" was created. When a conflict is encountered, the current search path is pushed onto the paths stack and the position of the conflict is pushed onto the pebbles stack. This allow the rest of the current search to be completed and when finished, the other paths can be evaluated. An algorithm to implement this includes a supervisor function and a subfunction, which is called repeatedly. The algorithm initiates the pointers to the paths and pebbles stacks to the bottom of the stack, which is empty. The subfunction is called with the current paths and pebbles values from the stack as input. The subfunction will first evaluate the path from the paths stack up to the pebble from the pebbles stack by doing a "zeroes quiet" or "ones quiet" for each bit value up to the pebble. This ensures that all devices not on the current path of interest will be "quiet." The first time through the path will be empty, and the pebble will be one so no "quiets" will be performed. Next, the algorithm tests for presence of both a zero and a one at the current bit location. If both are found, there is a conflict. The current path up to this point is then loaded onto the paths stack with a zero at the current position, with the pebble loaded onto the pebbles stack as an indication of where the path ended. The algorithm then "takes the high road" and evaluates the next bit position until the final bit position is reached and every bit has been tested. Each pass results in one newly discovered device. The supervisor function then evaluates if there are any more paths and pebbles on the stack and runs the subfunction again if there is until no more conflicts exist. If no response is returned for either the zero or the one at a given bit position, an error condition exists and the algorithm returns an error path.

The design of a lighting control system of the invention has the following basic rules and steps. Every lighting control zone requires either a power pack or a connection to a bridge in order to power the zone's devices and communication bus. While devices within a zone can be wired in any order, connecting the power pack directly to a bridge is recommended. Also, while virtually any combination of devices can exist in a lighting control zone, each zone should only have at most one device with a photocell. Occupancy sensors should be chosen with coverage patterns and detection technology appropriate for the area to be covered, using multiple sensors of various types as needed. Photocell sensors should be added where significant daylight is available and where the photocell sensor can see all the lights it is controlling. Wall units with the appropriate function(s) should be added where local control is desired. An adequate number of power packs should be added such that all circuits can be switched and that sufficient system power is supplied. Each lighting control zone should be connected to a bridge or alternatively directly to a gateway. Because each device in the zone (e.g., sensors, wall units, power packs) has two preferably RJ-45 connector ports and are connected to each other in a daisy-chain fashion with a connection from one of the devices to a bridge or gateway, each zone should have, if wired correctly, exactly one open connector port (i.e., at the last device in the daisy-chain connection). Bridge to bridge hops should be minimized, and extra bridge ports should be left unused to accommodate the addition of future zones. Gateways should be placed such that connection to a preferably Ethernet LAN is convenient.

Alternatively, a lighting control zone can be created to operate in a pure stand-alone configuration, with no connection to the network backbone. Operation of the zone would be only sensor-based and manual, there would be no time-based control. The devices in such a zone would also be connected together in daisy-chain fashion, but there would be no connection to a bridge or gateway, thus leaving exactly two open connector ports.

In one embodiment of a lighting control system in accordance with the invention, the control software can support about 40 concurrent Web sessions and at least about 40 gateway. Each gateway can connect to about 400 downstream devices (including bridges), and there is no limit to the number of bridges per network (other than the 400-device limitation of a gateway). Also, the control software can support about 40 profiles per lighting control zone. The lighting control system of the invention can thus be advantageously used to create and control a very large system with a very large number of lighting devices.

Note that the lighting control system of the invention is not limited solely to the control of lighting devices, but alternatively or additionally may be used to control or work with other devices and systems, such as, for example, HVAC, fire detection, and security systems.

Thus it is seen that a networked lighting control system that uses wireless connectivity and distributed intelligence to control multiple independent zones of lighting is provided. One skilled in the art will appreciate that the invention can be practiced by other than the described embodiments, which are presented for purposes of illustration and not of limitation, and the invention is limited only by the claims which follow.

We claim:

1. A lighting control system comprising:
    a lighting control device operative to automatically control the on/off state of lighting in a defined area, the lighting control device programmable to vary the manner in which the on/off state of the lighting is controlled and comprises at least one of an occupancy sensor or a daylight sensor, the lighting control device located at a first physical location;
    a communications router connected to the lighting control device and operative to receive information from the lighting control device and to send programming instructions to the lighting control device, the communications router located at a second physical location different than the first physical location;
    a gateway in communication with the communications router and operative to receive the information from the communications router and to send programming instructions to the communications router for the lighting control device, the gateway having an input/output interface operative to receive manually input programming instructions for the lighting control device and to display information regarding the lighting control device or the lighting in the defined area;
    a communications network connected to the gateway, the gateway operative to receive programming instructions and requests for information via the communications network;
    a host computer or server connected to the communications network and operative to receive information from the gateway via the communications network, the host computer or server located at a third physical location different than the first physical location and the second physical location; and
    lighting control software executing on the host computer or server; wherein:
    the host computer or server executing the control software is operative to program the lighting control device, process the information received from the gateway, and display information pertaining to the lighting control device, the lighting in the defined area, the communications router, the gateway, and the communications network; and
    the lighting control device operates to control the on/off state of the lighting in the defined area automatically and independently of the host computer, the lighting control software, the gateway, and the communications router should the host computer, the gateway, or the communications router become inoperative or disconnected from the lighting control device.

2. The system of claim 1 further comprising a power/relay device connected to the lighting control device and to the lighting in the defined area, the power/relay device supplying power to the lighting control device and comprising a relay connecting/disconnecting line voltage to the lighting in the defined area.

3. The system of claim 1 wherein the lighting control device is an occupancy or daylight sensor comprising a microcontroller or a combination wall switch and occupancy sensor comprising a microcontroller.

4. The system of claim 1 wherein the lighting control device controls the light level of the lighting in the defined area in response to either manual inputs received from the defined area, sensory inputs received from the defined area in conjunction with programmed instructions stored in the lighting control device, or programming instructions received from the communications router.

5. The system of claim 1 wherein the lighting control device simultaneously automatically controls the on/off state of a second load in the defined area, the lighting control device configured to automatically control the on/off state of the lighting in accordance with a first set of parameter values and to automatically control the on/off state of the second load in accordance with a second set of parameter values.

6. The system of claim 1 wherein the communications router receives power and distributes some of the received power to the lighting control device.

7. The system of claim 1 wherein the communications router has a plurality of input/outputs, receives power at one of the input/outputs, and distributes at least some of the received power equally among the other input/outputs.

8. The system of claim 1 wherein the gateway, the communications router and the lighting control device operate automatically and independently of the host computer and the lighting control software should the host computer become inoperative or disconnected from the gateway.

9. The system of claim 1 wherein communications router receives power and distributes at least some of the received power to the gateway.

10. The system of claim 1 wherein the connection between the lighting control device and the communications router is via category 5 cabling.

11. The system of claim 1 wherein the communication between the communications router and the gateway is via category 5 cabling.

12. The system of claim 1 further comprising a transceiver connected to the gateway, the communication between the communications router and the gateway is via wireless communication between the communications router and the transceiver.

13. The system of claim 1 wherein the gateway comprises a microcontroller, a display screen, and a keypad.

14. The system of claim 1 wherein the lighting control device or the gateway comprises capacitive sensing finger touch controls that dynamically adjust finger press thresholds based on measured electromagnetic or radio frequency noise and measured baseline capacitance.

15. The system of claim 1 wherein the communications network is a local area network.

16. The system of claim 1 wherein the lighting control software is World Wide Web based.

17. The system of claim 1 wherein the lighting control software is accessible remotely from the defined area and from the host computer or server by a computer device connected via wired or wireless communication to the communications network.

18. The system of claim 17 wherein the computer device is a personal computer, a laptop computer, or a handheld computer device.

19. The system of claim 1 wherein the lighting control device is programmable at the device itself, the gateway, the host computer or sever, and a remote computer device accessing the lighting control software via a connection to the communications network.

20. The system of claim 1 wherein the on/off state of the lighting in the defined area is controllable at the lighting control device, the gateway, the host computer or sever, and a remote computer device accessing the lighting control software via a connection to the communications network.

21. The system of claim 1 wherein information pertaining to the lighting control device or the lighting in the defined area is available at the gateway, the host computer or sever, and a remote computer device accessing the lighting control software via a connection to the communications network.

22. A lighting control system comprising:
a first plurality of lighting control devices operative to collectively control lighting in a first defined area, the first plurality of lighting control devices including at least one of an occupancy sensor or a daylight sensor;
a second plurality of lighting control devices operative to collectively control lighting in a second defined area different than the first defined area, the second plurality of lighting control devices including at least one of an occupancy sensor or a daylight sensor;
a communications router having a plurality of input/outputs, the first plurality of lighting control devices connected to one of the input/outputs and the second plurality of lighting control devices connected to another one of the input/outputs, the communications router operative to receive information from the first and second pluralities of lighting control devices and to send programming instructions to the first and second pluralities of lighting control devices, the communications router located at a first physical location;
a gateway in communication with the communications router and operative to receive information from the communications router and to send programming instructions to the communications router for at least some of the first and second pluralities of lighting control devices, wherein the communications router is connected between the gateway and the first and second pluralities of lighting control devices;
a communications network connected to the gateway, the gateway operative to receive programming instructions and requests for information via the communications network;
a host computer or server connected to the communications network and operative to receive information from the gateway via the communications network, the host computer or server located at a second physical location different than the first physical location, wherein the gateway is connected between the communications router and the host computer or server; and
lighting control software executing on the host computer or server; wherein:
the host computer or server executing the lighting control software automatically searches for and identifies each of the lighting control devices in the first and second pluralities of lighting control devices.

23. The system of claim 22 wherein the host computer executing the lighting control software displays a diagram identifying each of the lighting control devices and illustrating the physical connections between each of the lighting control devices, the communications router, and the gateway.

24. The system of claim 22 wherein the host computer executing the lighting control software first automatically searches for and identifies each of the lighting control devices in the first plurality of lighting controls zones before automatically searching for and identifying each of the lighting control devices in the second plurality of lighting control devices.

25. The system of claim 22 wherein the automatic search and identification of each lighting control device in the first plurality of lighting control devices is initiated at the communications router.

26. The system of claim 22 wherein the first plurality of lighting control devices is connected in a daisy-chain manner.

27. The system of claim 22 wherein the identification information pertaining to the communications router is manually provided to the lighting control software prior to the automatic search and identification of each lighting control device.

28. The system of claim 22 wherein identification of the input/outputs to which the first and second pluralities of lighting control devices are connected is manually provided to the lighting control software prior to the automatic search and identification of each lighting control device.

29. The system of claim 22 wherein the gateway has an input/output interface operative to receive manually input programming instructions for any of the lighting control devices and to display information regarding any of the lighting control devices or the lighting in the first or second defined areas.

30. A method of operating a lighting control system comprising:
- activating automatic on functionality upon manual activation of a switch that turns on lighting in a defined area wherein the lighting stays on upon sensing of occupancy within the defined area;
- initiating a time delay upon sensing of vacancy within the defined area;
- canceling the time delay upon sensing of occupancy within the defined area during the time delay;
- automatically turning off the lighting upon expiration of the time delay without sensing occupancy within the defined area during the time delay;
- maintaining the automatic on functionality during a grace period in response to the automatically turning off the lighting, the grace period commencing upon expiration of the time delay;
- automatically turning on lighting upon sensing of occupancy within the defined area during the grace period and maintaining the automatic on functionality in response thereto;
- deactivating the automatic on functionality upon expiration of the grace period without sensing occupancy within the defined area during the grace period wherein the lighting will not automatically turn on upon sensing of occupancy within the defined area thereafter; and
- deactivating the automatic on functionality upon a second manual activation of the switch while the lighting is on wherein the lighting will not automatically turn on upon sensing of occupancy within the defined area thereafter.

31. The method of claim 30 further comprising programming the length of the time delay.

32. The method of claim 30 further comprising programming the length of the grace period.

33. The method of claim 30 wherein, after the activating automatic on functionality, a second manual activation of the switch while the lighting is on turns off the lighting.

34. The method of claim 30 further comprising monitoring status of the lighting, the time delay, or the grace period on a display.

35. The method of claim 30 further comprising overriding the deactivating automatic on functionality by remotely restoring automatic on functionality.

* * * * *